(12) United States Patent
Pervan

(10) Patent No.: US 11,905,717 B2
(45) Date of Patent: Feb. 20, 2024

(54) SINGLE LAYER SCATTERING OF POWDER SURFACES

(71) Applicant: CERALOC INNOVATION AB, Viken (SE)

(72) Inventor: Darko Pervan, Viken (SE)

(73) Assignee: Ceraloc Innovation AB, Viken (SE)

( * ) Notice: Subject to any disclaimer, the term of this patent is extended or adjusted under 35 U.S.C. 154(b) by 1081 days.

(21) Appl. No.: 16/516,859

(22) Filed: Jul. 19, 2019

(65) Prior Publication Data

US 2019/0338534 A1 Nov. 7, 2019

Related U.S. Application Data

(63) Continuation of application No. 14/626,942, filed on Feb. 20, 2015, now Pat. No. 10,392,812, which is a (Continued)

(51) Int. Cl.
*E04F 15/10* (2006.01)
*B05D 1/36* (2006.01)
(Continued)

(52) U.S. Cl.
CPC ............ *E04F 15/102* (2013.01); *B05C 19/04* (2013.01); *B05D 1/36* (2013.01); *B05D 1/38* (2013.01);
(Continued)

(58) Field of Classification Search
CPC .. B05C 19/04; B05D 1/36; B05D 1/38; B05D 2401/32; B05D 7/56; B32B 2037/243;
(Continued)

(56) References Cited

U.S. PATENT DOCUMENTS 2,831,793 A   4/1958   Elmendorf
2,962,081 A   11/1960  Dobry et al.
(Continued)

FOREIGN PATENT DOCUMENTS

CA   2 380 651 A1   2/2001
CA   2 557 096 A1   7/2005
(Continued)

OTHER PUBLICATIONS

Extended European Search Report issued in EP 20163753.5, dated Sep. 21, 2020, European Patent Office, Munich, DE, 9 pages.
(Continued)

*Primary Examiner* — Alexander M Weddle
(74) *Attorney, Agent, or Firm* — Boone IP Law

(57) ABSTRACT

Methods and equipment to apply a decorative surface on a building panel wherein the surface includes a mix of fibres, binders, wear resistant particles and pigments. Layers may be applied as separate layers with equipment that applies essentially only one of the materials in the surface mix. A method of forming a surface layer on a substrate, the method including forming a first layer of a first material, applying a second layer of a second material on the first layer, mixing the first and second layers into a mix comprising the first and the second material, and applying the mix on a substrate for forming a surface layer.

22 Claims, 11 Drawing Sheets

Related U.S. Application Data continuation of application No. 13/962,272, filed on Aug. 8, 2013, now Pat. No. 8,993,049.

(60) Provisional application No. 61/681,279, filed on Aug. 9, 2012.

(51) Int. Cl.
    *B05D 1/38* (2006.01)
    *B05D 7/00* (2006.01)
    *B05C 19/04* (2006.01)
    *B32B 37/24* (2006.01)

(52) U.S. Cl.
    CPC ............ *B05D 7/56* (2013.01); *E04F 15/107* (2013.01); *B05D 2401/32* (2013.01); *B32B 2037/243* (2013.01); *B32B 2317/16* (2013.01); *B32B 2607/00* (2013.01)

(58) Field of Classification Search
    CPC ............ B32B 2317/16; B32B 2607/00; E04F 15/102; E04F 15/107
    See application file for complete search history.

(56) References Cited

U.S. PATENT DOCUMENTS

| | | |
|---|---|---|
| 2,962,381 A | 11/1960 | Dobry et al. |
| 3,032,820 A | 5/1962 | Johnson |
| 3,283,740 A | 11/1966 | Fredricksen |
| 3,286,006 A | 11/1966 | Annand |
| 3,308,013 A | 3/1967 | Bryant |
| 3,373,070 A | 3/1968 | Fuerst |
| 3,426,730 A | 2/1969 | Lawson et al. |
| 3,486,484 A | 12/1969 | Bullough |
| 3,647,500 A | 3/1972 | Mizuno |
| 3,673,020 A | 6/1972 | Jaeger |
| 3,846,219 A | 11/1974 | Kunz |
| 3,897,185 A | 7/1975 | Beyer |
| 4,131,705 A | 12/1978 | Kubinsky |
| 4,167,478 A | 9/1979 | Salete |
| 4,255,480 A | 3/1981 | Scher |
| 4,313,857 A | 2/1982 | Blount |
| 4,337,290 A | 6/1982 | Kelly et al. |
| 4,430,375 A | 2/1984 | Scher |
| 4,712,919 A | 12/1987 | Bouldin |
| 4,890,656 A | 1/1990 | Ohsumi et al. |
| 5,034,272 A | 7/1991 | Lindgren et al. |
| 5,258,216 A | 11/1993 | Von Bonin et al. |
| 5,422,170 A | 6/1995 | Iwata et al. |
| 5,543,193 A | 8/1996 | Tesch |
| 5,604,025 A | 2/1997 | Tesch |
| 5,753,758 A | 5/1998 | Marchese |
| 5,855,832 A | 1/1999 | Clausi |
| 5,891,564 A | 4/1999 | Schultz et al. |
| 6,103,377 A | 8/2000 | Clausi |
| 6,324,809 B1 | 12/2001 | Nelson |
| 6,468,645 B1 | 10/2002 | Clausi |
| 6,479,127 B1 | 11/2002 | Kornicer et al. |
| 6,617,009 B1 | 9/2003 | Chen |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Schuren et al. |
| 7,811,489 B2 | 10/2010 | Pervan |
| 8,349,234 B2 | 1/2013 | Ziegler et al. |
| 8,349,235 B2 | 1/2013 | Pervan et al. |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,617,439 B2 | 12/2013 | Pervan et al. |
| 8,663,785 B2 | 3/2014 | Ziegler et al. |
| 8,728,564 B2 | 5/2014 | Ziegler et al. |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,738,095 B2 | 8/2017 | Pervan |
| 9,757,928 B2 | 9/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 11,167,533 B2 | 11/2021 | Ziegler et al. |
| 11,235,565 B2 | 2/2022 | Pervan et al. |
| 11,313,123 B2 | 4/2022 | Pervan et al. |
| 11,318,726 B2 | 5/2022 | Pervan |
| 2001/0041767 A1 | 11/2001 | Frankoski et al. |
| 2002/0155297 A1 | 10/2002 | Schuren |
| 2003/0021915 A1 | 1/2003 | Rohatgi et al. |
| 2003/0102094 A1 | 6/2003 | Tirri et al. |
| 2003/0119987 A1 | 6/2003 | Eadara et al. |
| 2004/0191547 A1 | 9/2004 | Oldorff |
| 2004/0206036 A1 | 10/2004 | Pervan |
| 2004/0241486 A1 | 12/2004 | Wall et al. |
| 2005/0252130 A1 | 11/2005 | Martensson |
| 2006/0008630 A1 | 1/2006 | Thiers et al. |
| 2006/0024465 A1 | 2/2006 | Briere |
| 2006/0070321 A1 | 4/2006 | Au |
| 2006/0142433 A1 | 6/2006 | Rivers |
| 2006/0143869 A1 | 7/2006 | Pohlmann |
| 2006/0156672 A1 | 7/2006 | Laurent et al. |
| 2006/0183853 A1 | 8/2006 | Sczepan |
| 2007/0085064 A1 | 4/2007 | Harris |
| 2007/0184244 A1 | 8/2007 | Doehring |
| 2007/0207296 A1 | 9/2007 | Eisermann |
| 2007/0224438 A1 | 9/2007 | Van Benthem et al. |
| 2007/0256804 A1 | 11/2007 | Garcis Espino et al. |
| 2008/0032120 A1 | 2/2008 | Braun |
| 2008/0176039 A1 | 7/2008 | Chen et al. |
| 2008/0263985 A1 | 10/2008 | Hasch et al. |
| 2009/0145066 A1* | 6/2009 | Pervan .................. E04F 15/107 209/11 |
| 2009/0155612 A1* | 6/2009 | Pervan .................... B32B 21/14 428/326 |
| 2009/0311433 A1 | 12/2009 | Wittmann |
| 2010/0092731 A1* | 4/2010 | Pervan ..................... E04C 2/16 118/200 |
| 2010/0223881 A1 | 9/2010 | Kalwa |
| 2010/0291397 A1 | 11/2010 | Pervan et al. |
| 2010/0300030 A1 | 12/2010 | Pervan et al. |
| 2010/0319282 A1 | 12/2010 | Ruland |
| 2010/0323187 A1 | 12/2010 | Kalwa |

(56) References Cited

U.S. PATENT DOCUMENTS

| | | |
|---|---|---|
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1* | 8/2011 | Lindgren ............... B44C 3/005 428/212 |
| 2011/0247748 A1 | 10/2011 | Pervan et al. |
| 2011/0250404 A1 | 10/2011 | Pervan et al. |
| 2011/0293823 A1 | 12/2011 | Bruderer et al. |
| 2011/0293906 A1 | 12/2011 | Jacobsson |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0308774 A1 | 12/2012 | Håkansson et al. |
| 2013/0065072 A1 | 3/2013 | Pervan |
| 2013/0092314 A1 | 4/2013 | Zeigler et al. |
| 2013/0095315 A1 | 4/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0044872 A1 | 2/2014 | Pervan |
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199513 A1 | 7/2014 | Pervan et al. |
| 2014/0199558 A1 | 7/2014 | Pervan et al. |
| 2014/0234531 A1 | 8/2014 | Ziegler et al. |
| 2014/0255670 A1 | 9/2014 | Kalwa |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0368180 A1 | 12/2016 | Ziegler et al. |
| 2016/0369507 A1 | 12/2016 | Pervan |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Ziegler et al. |
| 2017/0232761 A1 | 8/2017 | Pervan et al. |
| 2017/0305119 A1 | 10/2017 | Bergelin et al. |
| 2017/0348984 A1 | 12/2017 | Pervan et al. |
| 2018/0002934 A1 | 1/2018 | Pervan |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Persson et al. |
| 2019/0284821 A1 | 9/2019 | Pervan |
| 2019/0292796 A1 | 9/2019 | Pervan et al. |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0078305 A1 | 3/2021 | Schulte |
| 2021/0101310 A1 | 4/2021 | Lindgren et al. |
| 2021/0197534 A1 | 7/2021 | Ziegler et al. |
| 2021/0277670 A1 | 9/2021 | Ziegler et al. |
| 2021/0323297 A1 | 10/2021 | Slottemo et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |
| 2022/0063326 A1 | 3/2022 | Persson et al. |

FOREIGN PATENT DOCUMENTS

| | | |
|---|---|---|
| CH | 298894 A | 5/1954 |
| DE | 7148789 U | 4/1972 |
| DE | 29 39 828 A1 | 4/1981 |
| DE | 33 34 921 A1 | 4/1985 |
| DE | 202 14 532 U1 | 2/2004 |
| DE | 20 2006 007 797 U1 | 8/2006 |
| DE | 10 2004 062 649 B4 | 9/2006 |
| DE | 10 2005 046 264 A1 | 4/2007 |
| DE | 10 2006 024 593 A1 | 12/2007 |
| EP | 0 129 430 A2 | 12/1984 |
| EP | 0 129 430 B1 | 1/1990 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 1 088 652 A2 | 4/2001 |
| EP | 1 209 199 A1 | 5/2002 |
| EP | 1 249 322 A1 | 10/2002 |
| EP | 1 454 763 A2 | 9/2004 |
| EP | 1 681 103 A2 | 7/2006 |
| EP | 1 847 385 A1 | 10/2007 |
| EP | 1 961 556 A1 | 8/2008 |
| EP | 1 997 623 A1 | 12/2008 |
| EP | 2 025 484 A1 | 2/2009 |
| EP | 1 454 763 B1 | 8/2009 |
| EP | 2 246 500 A2 | 11/2010 |
| EP | 2 264 259 A2 | 12/2010 |
| EP | 2 272 667 A1 | 1/2011 |
| EP | 2 272 668 A1 | 1/2011 |
| EP | 1 674 224 B1 | 3/2011 |
| EP | 2 305 462 A1 | 4/2011 |
| EP | 1 847 385 B1 | 9/2011 |
| GB | 984 170 A | 2/1965 |
| GB | 1090450 | 11/1967 |
| GB | 2 193 205 A | 2/1988 |
| JP | 11-291203 A | 10/1999 |
| JP | 2005-034815 A | 2/2005 |
| NZ | 225556 A1 | 2/1992 |
| WO | WO 00/22225 A1 | 4/2000 |
| WO | WO 00/44576 A1 | 8/2000 |
| WO | WO 01/12403 A1 | 2/2001 |
| WO | WO 01/48333 A1 | 7/2001 |
| WO | WO 01/64408 A1 | 9/2001 |
| WO | WO 02/081120 A1 | 10/2002 |
| WO | WO 2004/042168 A1 | 5/2004 |
| WO | WO 2004/050359 A1 | 6/2004 |
| WO | WO 2004/067874 A2 | 8/2004 |
| WO | WO 2005/054600 A1 | 6/2005 |
| WO | WO 2005/066431 A2 | 7/2005 |
| WO | WO 2005/116361 A1 | 12/2005 |
| WO | WO 2006/043893 A1 | 4/2006 |
| WO | WO 2006/126930 A1 | 11/2006 |
| WO | WO 2007/042258 A1 | 4/2007 |
| WO | WO 2009/065768 A1 | 5/2009 |
| WO | WO 2009/065769 A2 | 5/2009 |
| WO | WO 2009/065769 A3 | 5/2009 |
| WO | WO 2009/124704 A1 | 10/2009 |
| WO | WO 2011/129755 A2 | 10/2011 |

OTHER PUBLICATIONS

International Search Report issued in PCT/SE2013/050957, dated Jan. 9, 2014, 8 pages, Patent-och registreringsverket, Stockholm, SE.

Extended European Search Report issued in EP13827653.0, dated Jul. 15, 2016, European Patent Office, Munich, DE, 7 pages.

Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.

(56) References Cited

OTHER PUBLICATIONS

Engstrand, Ola (Contact)/Valinge Innovation, Technical Disclosure entitled "WFF Embossing," May 15, 2009, IP.com No. IPCOM000183105D, IP.com PriorArtDatabase, 36 pages.

Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.

Parquet International, "Digital Printing is still an expensive process," Mar. 2008, cover page/pp. 78-79, www.parkettmagazin.com.

Floor Daily, "Shaw Laminates: Green by Design," Aug. 13, 2007, 1 pg, Dalton, GA.

\* cited by examiner

KNOWN TECHNOLOGY

KNOWN TECHNOLOGY

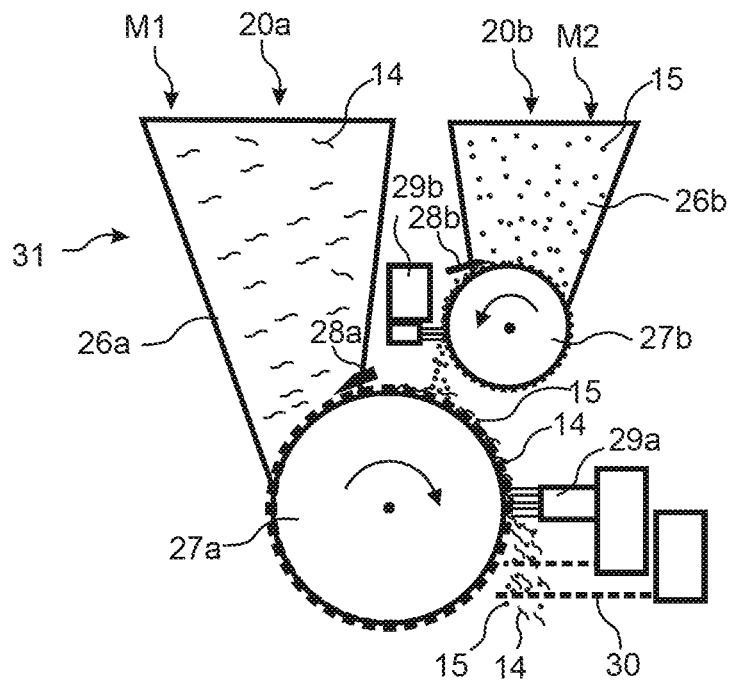
*Fig. 8a*
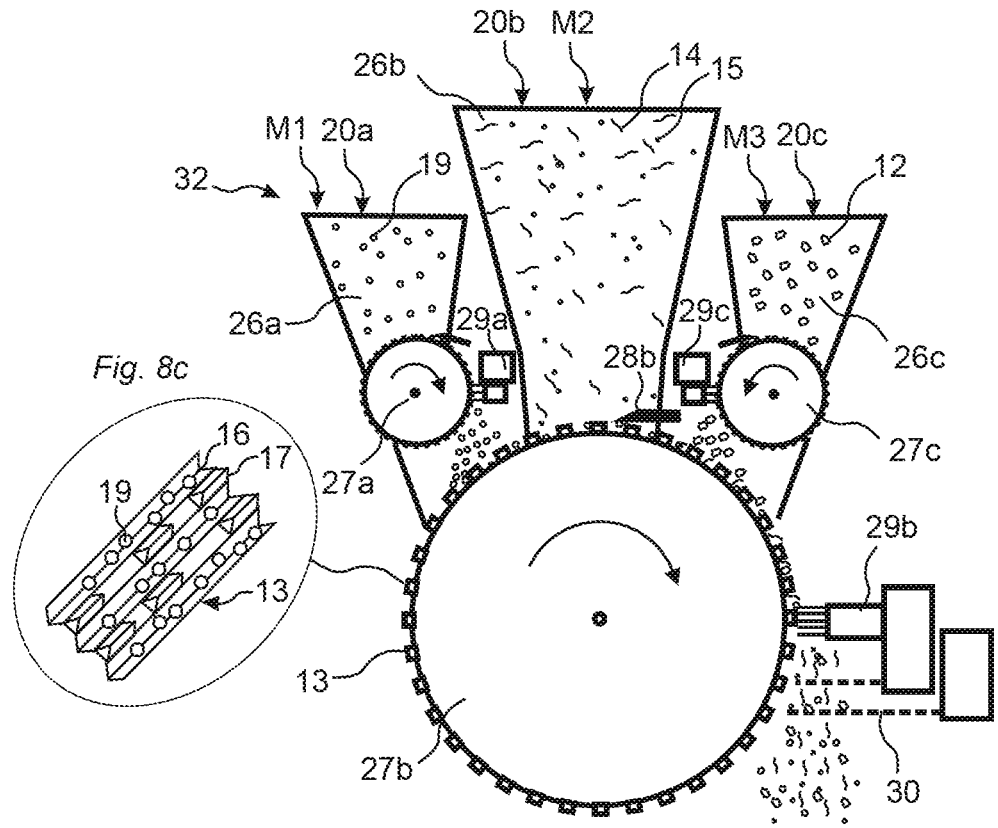
*Fig. 8b*
*Fig. 8c*

SINGLE LAYER SCATTERING OF POWDER SURFACES

CROSS REFERENCE TO RELATED APPLICATIONS

The present application is a continuation of U.S. application Ser. No. 14/626,942, filed on Feb. 20, 2015, which is a continuation of U.S. application Ser. No. 13/962,272, filed on Aug. 8, 2013, now U.S. Pat. No. 8,993,049, which claims the benefit of U.S. Provisional Application No. 61/681,279, filed on Aug. 9, 2012. The entire contents of U.S. application Ser. No. 14/626,942, U.S. application Ser. No. 13/962,272 and U.S. Provisional Application No. 61/681,279 are hereby incorporated herein by reference in their entirety.

TECHNICAL FIELD

The disclosure generally relates to the field of fibre-based panels with a decorative surface, preferably floor panels, wall panels and furniture components. The disclosure relates to production methods and equipment to produce such panels.

FIELD OF APPLICATION

Embodiments of the present invention are particularly suitable for use in floating floors, which may be formed of floor panels comprising a core and a decorative wear resistant solid surface layer, comprising fibres, binders and wear resistant particles, that have been applied on the core as a powder as described in WO 2009/065769. The following description of technique, problems of known systems and objects and features of embodiments of the invention will therefore, as a non-restrictive example, be aimed above all at this field of application and in particular at powder based floorings which are similar to conventional laminated floorings.

It should be emphasized that embodiments of the invention can be used to produce a surface layer integrated with a core or a separate surface layer, which is, for example, applied to a core in order to form a panel. Embodiments of the invention can also be used in building panels such as, for example, wall panels, ceilings, and furniture components and similar. Such panel may have a surface layer that comprises powder combined with paper, veneer, foils, etc. where the powder may be used, for example, as a backing layer, a sub layer or as a powder overlay and similar. Embodiments of the invention may also be used to apply different dry materials in powder form on any type of essentially flat surfaces.

BACKGROUND

Direct pressed laminated flooring (DPL) usually comprises a core of a 6-12 mm fibre board, a 0.2 mm thick upper decorative surface layer of laminate and a 0.1-0.2 mm thick lower balancing layer of laminate, plastic, paper or like material.

The surface layer of a laminate floor is characterized in that the decorative and wear properties are generally obtained with two separate layers one over the other. The decorative layer is generally a printed paper and the wear layer is a transparent overlay paper, which comprises small aluminium oxide particles.

The printed decorative paper and the overlay are impregnated with melamine formaldehyde resin and laminated to a wood fibre based core under heat and pressure.

Recently new "paper free" floor types have been developed with solid surfaces comprising a substantially homogenous mix of fibres, binders and wear resistant particles. Such floors are referred to as WFF (Wood Fibre Floor).

The wear resistant particles are aluminium oxide particles, the binders are thermosetting binders such as melamine formaldehyde and the fibres are wood based. In most applications decorative particles such as, for example, colour pigments are included in the homogenous mix. All these materials are mixed together and applied in dry form as a mixed powder on a core, generally a HDF core, and cured under heat and pressure to a 0.1-1.0 mm solid surface layer.

Several advantages over known technology and especially over conventional laminate floorings can be obtained. The wear resistant surface layer, which is a homogenous mix, can be made much thicker and a wear resistance is achieved, which is considerably higher. New and very advanced decorative effects can be obtained with deep embossing and by separate decorative materials, which can be incorporated into the homogenous surface layer and coordinated with the embossing. An increased impact resistance can be reached with a homogenous surface layer, which is thicker than a paper based laminate surface and which may have a higher density. The homogenous surface layer can comprise particles that have a positive impact on sound and moisture properties. Production costs can be reduced since low cost and even recycled materials can be used and several production steps can be eliminated.

Powder technology is very suitable to produce a decorative surface layer, which is a copy of stone or ceramics. It is also possible to create wood designs and other advanced designs with high definition digital printers that use a non-impact printing processes. The digital printer has print heads, generally so called Piezo heads, that "fire" drops of ink from the print heads and into the powder based substrate prior to pressing. Digital printing may be used to obtain the complete design or to just to add a wood grain structure to powder that already comprises a basic colour.

The quality of the powder-based surface is to a large extent affected by the mixing of the different materials and the application of the powder mix on the core. These two production steps are also usually the most costly and crucial parts of the production process.

Definition of Some Terms

In the following text, the visible surface of the installed floor panel is called "front side", while the opposite side of the floor panel, facing the sub floor, is called "rear side". By "surface layer" are meant all layers, which give the panel its decorative properties and its wear resistance.

By a "WFF mix" is meant a mix of materials comprising fibres, binders, wear resistant particles and a colour substance, that is applied as powder on a carrier.

By "WFF panel" is meant a floor panel comprising a solid surface, which is obtained by a WFF mix that is applied on a core, such as, for example, HDF, and cured under heat and pressure.

Known Technique and Problems Thereof

The description below of various known aspects is the applicants' characterization of such, and is not an admission that any of the descriptions below is prior art. The described known embodiments may be used partly or completely in different combination in embodiments of the described invention.

FIG. 1a-d shows known embodiments of the new "paper free" and powder based WFF panel with a solid surface 5 comprising a powder mix of wood fibres 14, wear resistant aluminium oxide particles 12, a powder based melamine formaldehyde binder 19 and colour pigments 15. Such panels and methods to produce such panels are known from WO 2009/065769. A powder mix comprising the above-mentioned four materials is hereafter referred to as WFF mix 35.

The four types of materials that are used in a WFF mix have different sizes, form and density. The wood fibres 14 may have a diameter of 20-50 μm, for example, about 30 μm, and a length of 20-300 μm. The aluminium oxide particles 12 may have a length, width and thickness of 60-125 μm, for example, about 100 μm. The spray dried melamine formaldehyde particles 19 are generally smaller and may have a diameter of about 10-200 μm and the pigments 15 are very small with diameters less than about 1 μm. The relative sizes are shown in FIG. 1a.

FIG. 1b shows a WFF mix 35 where the above-mentioned materials have been mixed together. The WFF mix may comprise about 80% by weight wood fibres 14 and melamine powder 19 and about 20% by weight aluminium oxide 12 and pigments 15.

The wood fibres are generally refined, mechanically worked, and are of the same type as used in HDF and particleboard. They may comprise natural resins such as lignin. Transparent processed fibres (for example, bleached fibres) may be also be used. The solid surface layer may comprise other decorative materials or chemicals.

The most used binder is melamine or urea formaldehyde binder. Any other binder, preferably synthetic thermosetting binders, can be used.

FIG. 1c shows a cross section of a WFF floor panel 1. The surface 5 comprising a solid WFF layer is generally applied as one single layer of a WFF mix in dry powder form on a wood based core 6, such as, for example, HDF, and cured under heat and pressure. The melamine formaldehyde resin binder 19 melts during pressing and penetrates into the upper part of the core 6 and connects the solid cured surface layer to the core. The panel may comprise a backing layer 4 on the rear side that forms a balancing layer and keeps the panel flat after production and when humidity changes. The backing layer 4 comprises a mix of wood fibres and melamine formaldehyde binders that has been applied as one layer on the rear side. The powder is sprayed with water and partly cured by IR lamps such that a hard skin is formed that allows the panel to be turned with the rear side pointing downwards prior to the application of the WFF mix on the upper side.

FIG. 1d shows that the surface layer 5 may comprise two layers L1, L2 with different material compositions that are applied as two separate layers. The first layer L1, hereafter referred to as sub layer 3, may comprise a mix of wood fibres and melamine formaldehyde binder only in order to save material. Generally the sub layer has also a lower melamine formaldehyde content than the second layer L2, hereafter referred to as the top layer 2, which comprises a complete WFF mix of fibres 14, melamine formaldehyde 19, colour pigments 15 and aluminium oxide 12. The sub layer 3 may comprise colour pigments that match the basic design of the top layer 2.

FIG. 2a shows productions steps that are used to produce the fibres.

Wood or HDF-boards are reduced to chips or flakes in a pre-mill and transported into a mill-feeding container 7. The chips or flakes are brought down to the wanted particle size in a hammer mill 8. The particles that generally consist of small fibres or clusters of fibres are sieved with a net 9 with a mesh size of about 0.3 mm. Often such fibres or wood particles are defined to be less than 0.3 mm in size. The size may be less and the length could be longer due to the elongated shape of the fibres. The particles or fibres 14 are thereafter stored in a feeding container 10 and transported to a mixing station.

FIG. 2b shows a mixing station that is used to compose a mix that comprises several materials with pre-determined portions. The mixing station comprises several feeding containers 10 filled with the wood fibres 14, aluminium oxide 12, melamine formaldehyde powder 19, and colour pigment 15. A mixing container 11 is filled automatically with pre-defined portions of the above-mentioned materials, for example, 35% by weight wood fibre, 10% by weight aluminium oxide, 10% by weight titanium dioxide as pigment and 45% by weight melamine formaldehyde binder. The four different materials are thereafter mixed during, for example, 20 minutes where the mixing container 11 rotates. Generally special rotating intensifiers are installed in the mixing container to provide an even distribution of the particles in mix.

The mixed material is thereafter transported as individual batches to a scattering unit in a production line. This type of separate batch production has several disadvantages. Only the amount of a pre-determined mix may be adjusted in a production line and the relative material portions are maintained. The mixing containers must be cleaned when a batch with a new colour is mixed. A major part of the wood fibres may be recycled fibres from the flooring production and such fibres may not be possible to use in a separate powder production factory due to high transportation costs.

The mixing operation is very important for the final quality of the WFF mix and the pressed surface. The mixing performs basically two different functions. It gives the mix the pre-defined portions of the various materials and it mixes the materials such that they are evenly distributed in the mix. An inferior mixing or variations in the material composition may give a porous surface and variation of the colour, wear resistance, impact resistance and climate stability.

FIG. 2c shows schematically a production line for production of a panel 1 comprising a powder based decorative surface 5 and a backing layer 4 connected to a core 6. A conveyor belt 23 moves the panel 1 such that it passes a scattering station 20b or several scattering station 20a, 20b in case a surface with a sub layer 3 and a top layer 2 is used.

A first scattering equipment 20a may apply the first layer L1 that is a sub layer 3. A second scattering equipment 20b applies a second layer L2 as a top layer comprising a complete WFF mix 35 on the first layer L1. The scattering equipment comprises generally a roller with needles and a brush that removes the powder from the roller. A balancing layer 4 of, for example, impregnated paper or a powder layer is preferably applied prior to this first scattering on the rear side of the core 6.

A stabilizing unit 24 sprays a water solution of mainly deionized water 21 over the WFF mix. The solution may comprise surface tension reducing agents and release agents. This spaying prevents the powder to be displaced and to blow away during the final pressing operation.

A heating device 22 with IR lights is used to dry the water prior to pressing. The core 6 with the surface layer 5 and the backing layer 4 are finally pressed in a continuous or discontinuous press 25 under heat and pressure such that the powder cures to a hard and wear resistant decorative surface layer.

A decorative pattern may be provided on the WFF mix by a digital ink printing device (not shown) or as liquid colour substance prior to pressing.

An even scattering is required in order to form a high quality surface. Generally 400-800 g/m2 is used and the scattering tolerance is about +−5%.

There are several problems connected to the transportation and the scattering of the powder in a WFF mix.

The materials in the WFF mix have different form, sizes and densities. It is therefore difficult to design a scattering unit that is optimal for all these four materials. Dry free wood fibres are rather light, thin and long and may form clusters. Aluminium oxide particles are relatively large and heavy. Melamine formaldehyde particles are small and round and may stick to each other and to the fibres, especially in a humid environment. Colour pigments are very small. The materials in the mix may separate during transportation and it is difficult to design scattering equipment that is able to handle a mix of all these four materials in an optimal way. The scattering equipment must be cleaned after each colour change and a new powder batch must be used in case the relative amount of, for example, melamine formaldehyde or aluminium oxide must be changed and adapted in order to meet other quality specifications.

Converting the materials to granules generally may partly solve such problems. This is difficult and costly.

It would be a major advantage if the mixing of the materials that form the powder based layers in a WFF panel could be improved or completely eliminated or if the application of the WFF mix may be made in a more flexible, cost efficient and precise way.

EP 2 264 259 describes that melamine binder powder may be scattered on a surface comprising cellulose fibres and aluminium oxide. It is also described that optionally pigments may be scattered together with cellulose fibres and binders. Such a production method is not suitable to provide improvements over other known methods.

OBJECTS AND SUMMARY

An objective of at least certain embodiments of the invention is to provide a building panel, preferably a floor panel, with a powder based surface comprising different materials such as fibres, binders, wear resistant particles and colour pigments where the different materials are applied on a core in a more flexible and cost efficient way and with improved production tolerances compared to known technology.

The above objectives are exemplary, and the embodiments of the invention may accomplish different or additional objectives.

Embodiments of the invention are based on two major principles. According to a first principle separate materials may be applied in separate layers directly on the core and on each other and the chemical reaction, the heat and the pressure of the pressing operation is used to combine and mix the materials after application on the core. According to a second principle separate materials may be applied as separate layers on each other and mixed prior to the application on the core. The first and the second principles may be partly or completely combined. Production methods according to these two basic principles may provide application of pre-determined portions of materials and mixing of such pre-determined portions such that a high quality powder based surface layer may be formed.

A first aspect of the invention is a method of forming a surface layer comprising a first, second and third layer. The method comprises:

forming a first layer comprising mainly fibres,
forming a second layer comprising mainly wear resistant particles, and
forming a third layer comprising mainly particles of a thermosetting binder.

This production method provides the advantages that a separate mixing of different materials may be avoided. The mixing is replaced by the pressing operation where melamine formaldehyde particles become liquid and penetrate into the other layers at the same time as aluminium oxide particles may be pressed into the wood fibre layer.

The first layer may be applied on a substrate, preferably a core. The substrate may also be a conveyor belt or transportation device. The core may be a wood fibre based board, preferably a HDF board.

The surface layer and the core may form a panel, preferably a floor panel.

The fibres may be wood fibres.

The binder may be a melamine formaldehyde binder, preferably in powder form.

The wear resistant particles may be aluminium oxide particles.

The second layer may be applied on the first layer. The third layer may be applied on the second layer.

The first, second and third layers may each comprise essentially one material with a material content of at least about 80% of the total weight of the first, second or third layer, respectively.

The first layer may comprise colour pigments and at least about 80% by weight wood fibres.

The method may further comprise applying heat and pressure to the layers.

According to a second aspect of the invention, a method of forming a surface layer on a substrate is provided. The method comprises:

forming a first layer of a first material,
applying a second layer of a second material on the first layer,
mixing the first and second layers into a mix comprising the first and the second material, and
applying the mix on a substrate for forming a surface layer.

The first and second layers may be applied on a moveable transportation device.

The substrate may be a core, preferably a wood fibre based core such as a HDF board. The substrate may also be a conveyor belt or transportation device.

The core and the surface layer may form a panel, preferably a floor panel.

The first material may comprise fibres, preferably wood fibres. The second material may comprise a thermosetting binder, preferably melamine formaldehyde particles.

The first material may comprise a thermosetting binder, preferably melamine formaldehyde particles. The second material may comprise fibres, preferably wood fibres.

The method may further comprise forming a third layer of a third material.

The third material may comprise wear resistant particles or colour pigments.

The method may further comprise forming a fourth layer of a fourth material.

The fourth material may comprise wear resistant particles or colour pigments.

According a third aspect, a scattering equipment for mixing a first and second material is provided. The scattering equipment comprises:
- a first dispensing device,
- a second dispensing device,
- at least one moveable transportation device,
- a mixing device,
- wherein the first dispensing device is adapted to apply a first material on the transportation device, the second dispensing device is adapted to apply a second material on the first material, said transportation device is moveable between the first and the second dispensing devices, and the mixing device is adapted to mix the first and second material and to remove the first and second material from the transportation device.

The moveable transportation device may be adapted to displace the first material from the first dispensing device to the second dispensing device. Thereby, the second material is applied on the first material. The second material is preferably applied as a layer. The first material may also be applied as a layer. The layer may be continuous or non-continuous.

In one embodiment, the first dispensing device may comprise a hopper and a roller, wherein the hopper is adapted to dispense the first material to the roller, and the roller is adapted to dispense the first material to the transportation device. The second dispensing device may comprise a hopper adapted to dispense the second material directly to said transportation device.

In one embodiment, the first dispensing device may comprise a hopper adapted to dispense the first material directly to the transportation device. The second dispensing device may comprise a hopper and a roller, wherein the hopper is adapted to dispense the second material to the roller, and the roller is adapted to dispense the second material the transportation device.

In another embodiment, both the first and the dispensing devices may comprise a hopper and a roller, respectively, wherein the hoppers are adapted to dispense the first and the second material, respectively, to the rollers, and the rollers are adapted to dispense the first and second material to the transportation device.

In another embodiment, both the first and the second dispensing devices may comprise a hopper adapted to dispense the first and second material directly to the transportation device.

The first material may comprise fibres, preferably wood fibres. The second material may comprise a thermosetting binder, preferably melamine formaldehyde particles.

The first material may comprise a thermosetting binder, preferably melamine formaldehyde particles. The second material may comprise fibres, preferably wood fibres.

The scattering equipment may further comprise a third dispensing device being adapted to dispense a third material.

The third material may comprise wear resistant particles or colour pigments.

The scattering equipment may further comprise a fourth dispensing device being adapted to dispense a fourth material.

The fourth material may comprise wear resistant particles or colour pigments.

The moveable transportation device may comprise a scattering belt. Alternatively, the moveable transportation device may be a conveyor belt, for example, an endless conveyor belt.

The moveable transportation device may comprise a roller. The roller or the scattering belt may comprise protrusions and/or cavities. The roller or the scattering belt may be etched or comprise a needle belt.

The mixing device may comprise a moving brush. The mix device is adapted to mix the materials and remove the material from the transportation device. The brush may be adapted to oscillate or vibrate in order to remove material from the transportation device.

In all embodiments, by a layer is also contemplated a layer being interrupted by, for example, protrusions of the transportation device, roller or substrate. The layer may thus be non-continuous. Furthermore, in all embodiments the material may be a powder based material or a granular material. The thermosetting binder may also be replaced by a thermoplastic binder in all embodiments.

BRIEF DESCRIPTION OF THE DRAWINGS

The invention will in the following be described in connection to preferred embodiments and in greater detail with reference to the appended exemplary drawings, wherein.

FIGS. 8a-b illustrate scattering equipment;

DETAILED DESCRIPTION OF EMBODIMENTS

Figure 1A:
FIGS. 1a-d illustrate a known WFF panel with a powder based solid surface.
Figure 1B:
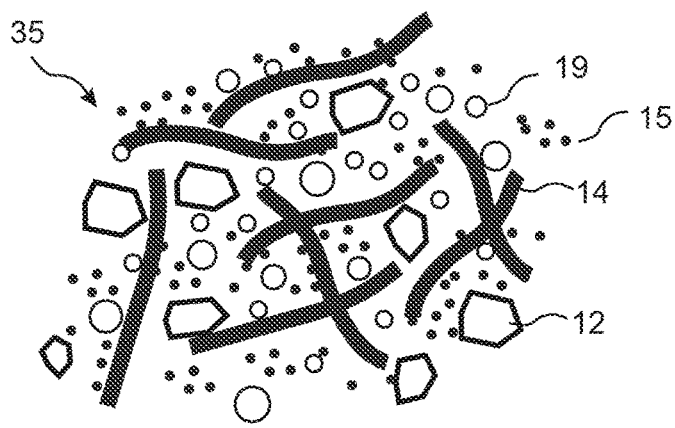
Figure 1C:
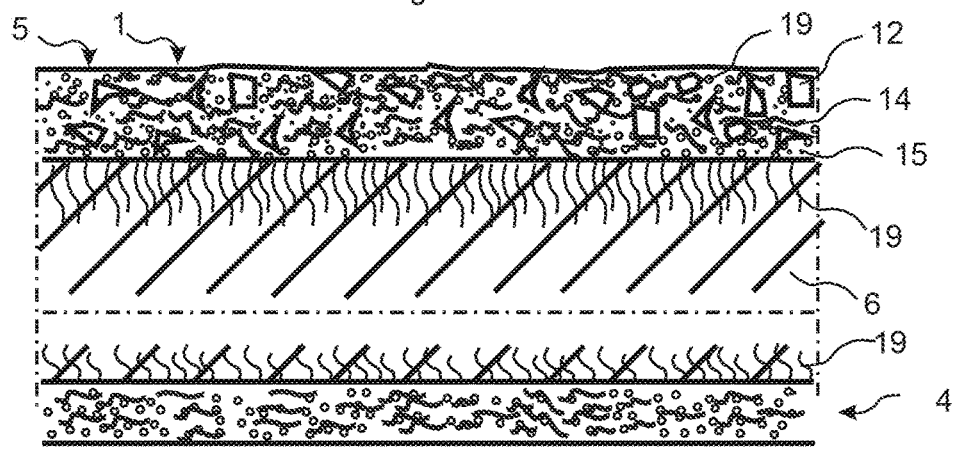
Figure 1D:
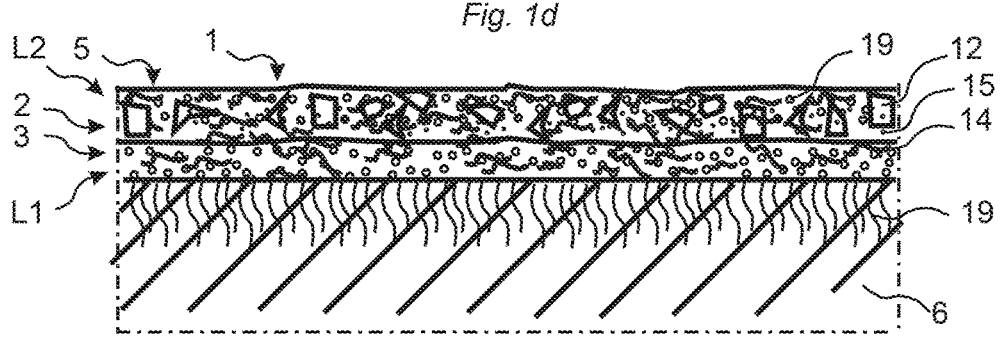
Figure 2A:
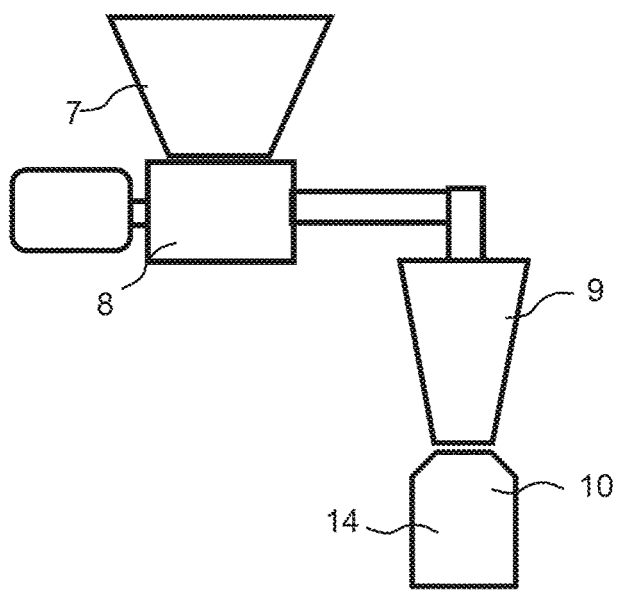
FIGS. 2a-c illustrate known fibre milling, powder mixing and forming of a powder based surface layer.
Figure 2B:
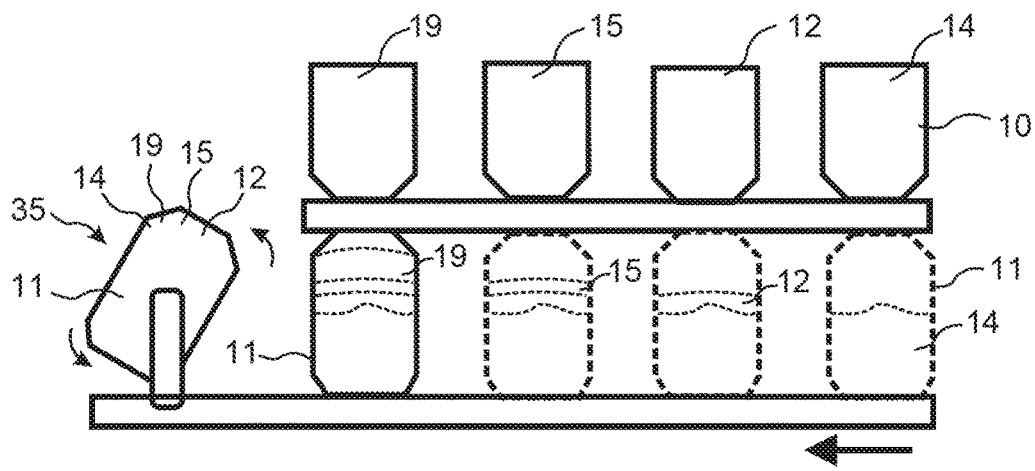
Figure 2C:
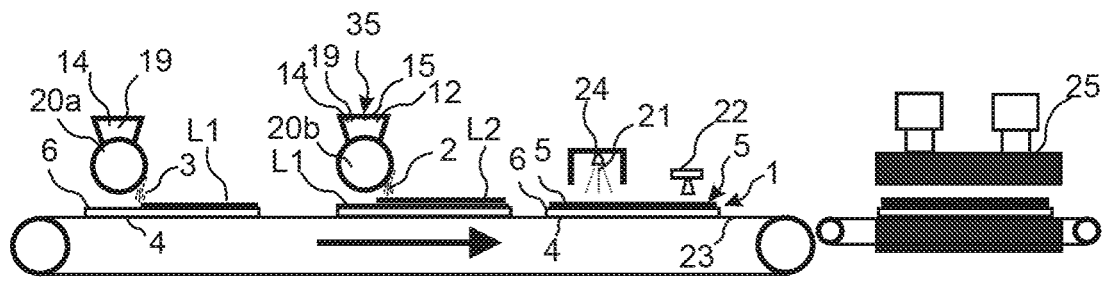
Figure 3A:
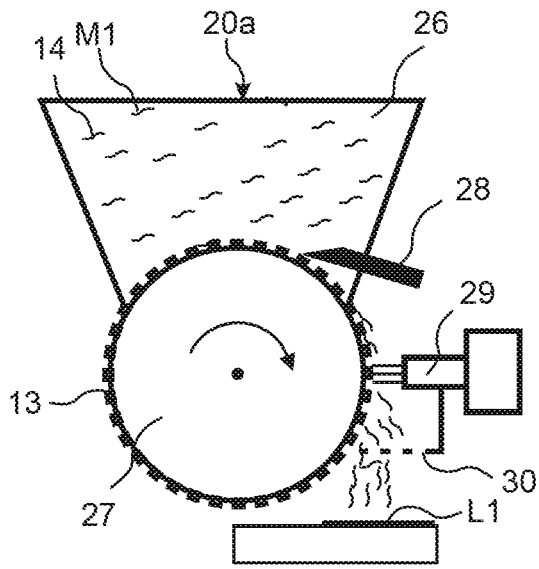
FIGS. 3a-d illustrate a production method to form a powder base surface according to an embodiment the invention.
Figure 3B:
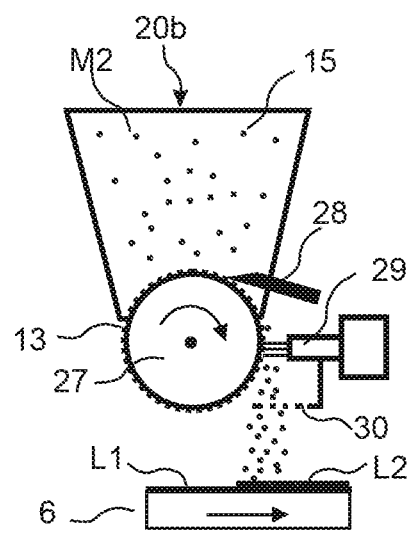

FIGS. 3a and 3b show two embodiments of a scattering equipment 20a, 20b that may be used to apply particles of a first M1 and second M2 material as individual layers L1, L2.

FIG. 3a shows a scattering equipment 20a that may be used to, for example, apply wood fibres 14. The scattering equipment comprises a hopper 26, a dispensing device 27, a movable transportation device 27 that may be combined with the dispensing device and a mixing and/or material removing device 29. A hopper 26 feeds the wood fibre powder to a dispensing device 27 that in this embodiment is a rotating roller 27 which may have a roller surface 13 comprising, for example, needles. The roller may have a diameter of, for example, 20-50 cm. The fibres are brought between the needles and a so called doctor blade 28 removes the excess fibres from the outer parts of the needles such that a predetermined amount of fibres are displaced by a movable transportation device, that in this embodiment is the dispensing device, towards a material removing device that may be an oscillating or rotating brush 29 that removes the fibres from the roller 27. The scattering equipment may comprises one or several rotating or oscillating meshes 30 that may oscillate or rotate in different directions and the fibres are distributed to an even layer L1.

FIG. 3b shows a scattering equipment 20b that may be used to, for example, apply a second layer L2 of aluminium oxide 12 or pigments 15 or melamine formaldehyde powder 19 on the first layer L1. The needles on the roller surface 13 as shown in FIG. 3a are preferably replaced by a structured roller surface that may be formed mechanically. Etching may also be used to form the roller surface 13. By using acids, bases or other chemicals to dissolve unwanted material, complex structures may be formed and the surface 13 of the roller 27 may be adapted to handle specific materials in a very precise way. Such high precision scattering equipment may apply layers of a few g/m2. The roller may have a diameter of, for example, 5-30 cm. Vibration may be used to facilitate release of the particles from the roller. The doctor blade 28 may be rigid or flexible and may have an edge that is adapted to the surface structure of the roller. A precise application may be obtained without brushes or meshes. However, in some applications brushes and/or meshes may be used. Oscillating or rotating meshes 30 may be formed such that they spread a specific material in a pre-defined way and they may be combined with one or several nets that may be used to sieve the particles before they are applied as a layer. Controlled air streams may be used to remove some unwanted particles. The layer thickness may be controlled by the rotation of the roller, the position of the doctor blade and the speed of the substrate that is intended to be covered with the particles, in this embodiment the core 6 of the panel.

The applied amount may be controlled by measuring the weight of a sample prior and after the application of the particles.

Engraving by cutting grooves into the roller surface 13 may also be used to form a specific structure on the surface of the roller 27.

The accuracy of a scattering equipment may be improved considerably if the scattering equipment 20 is designed to mainly handle one specific particle or powder type where the majority or preferably all particles have a similar form, size, density and weight. Thus, each dispensing device in the system may have a different surface structure and/or arrangement, e.g., different types of surface material, needles, etching, spacing, design, pattern, etc., than the other dispensing devices in the system.

Figure 3C:
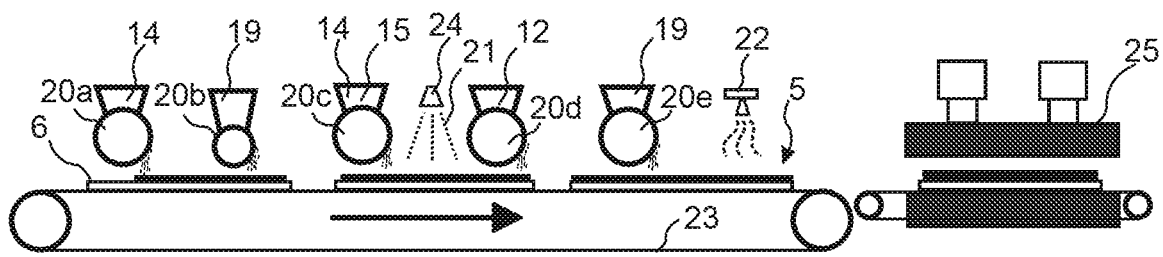

FIG. 3c show a method to form a powder-based surface 5 comprising a WFF mix according to an embodiment of the invention. Five dispensing devices 20a-20e are used to apply five different layers on a core 6. The first dispensing device 20a may apply wood fibres 14, the second dispensing device 20b may apply a thermosetting binder such as melamine formaldehyde powder 19, the third dispensing device 20c may apply a mixture of wood fibres 14 and pigments 15, the fourth dispensing device 20d may apply wear resistant particles such as aluminium oxide 12 and the fifth dispensing device 20e may apply a thermosetting binder such as melamine formaldehyde powder 19. Only one dispensing device 20c applies a mixed material that in this case is mainly wood fibres 14 and some pigments 15. Such a mix is rather easy to handle since the small pigments that are mixed with wood fibres are so small that they will not change the sizes or the behavior of the wood fibres and the mechanical handling of such pigment mixed fibres in the scattering equipment. All the other stations may be designed to handle mainly one specific material in an optimal way. One dispensing device 20a is designed to handle wood fibre material 14, two dispensing devices 20b, 20e are designed to handle melamine formaldehyde particles and one dispensing device 20d is designed to handle aluminium oxide particles. The production method comprises an intermediate stabilizing unit 24 that applies water 21 on the powder mix and a heating device 22 with preferably IR lamps where the water 21 is dried prior to pressing in the press 25.

It is preferred that the layers comprise exclusively one type of material. Improved functions may however also be reached if the layers preferably comprise mainly one material which means at least 50% by weight of one material type or even more preferably essentially one material type which means more than 80% of the total weight of an applied layer.

Figure 3D:
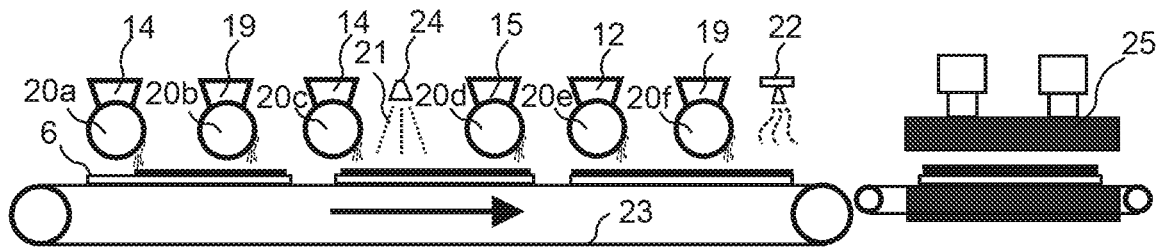

FIG. 3d shows that separate dispensing devices may apply all materials in the WFF mix as separate layers. Two dispensing devices 20a, 20c are designed to handle wood fibre material 14, two dispensing devices 20b, 20f are designed to handle melamine formaldehyde particles 19, one dispensing device 20e is designed to handle aluminium oxide particles 12 and one dispensing device 20d is designed to handle colour pigments 15. Such a production line will eliminate the need for the powder mixing. This provides lower costs and increased flexibility. The material content and composition of the surface layer 5 may be changed by just increasing or decreasing the speed of the dispensing devices. A higher content of, for example, aluminium oxide or melamine formaldehyde and a lower content of pigments and fibres may be obtained within a few seconds. Costly cleaning of mixing containers may be avoided.

Figure 4A:
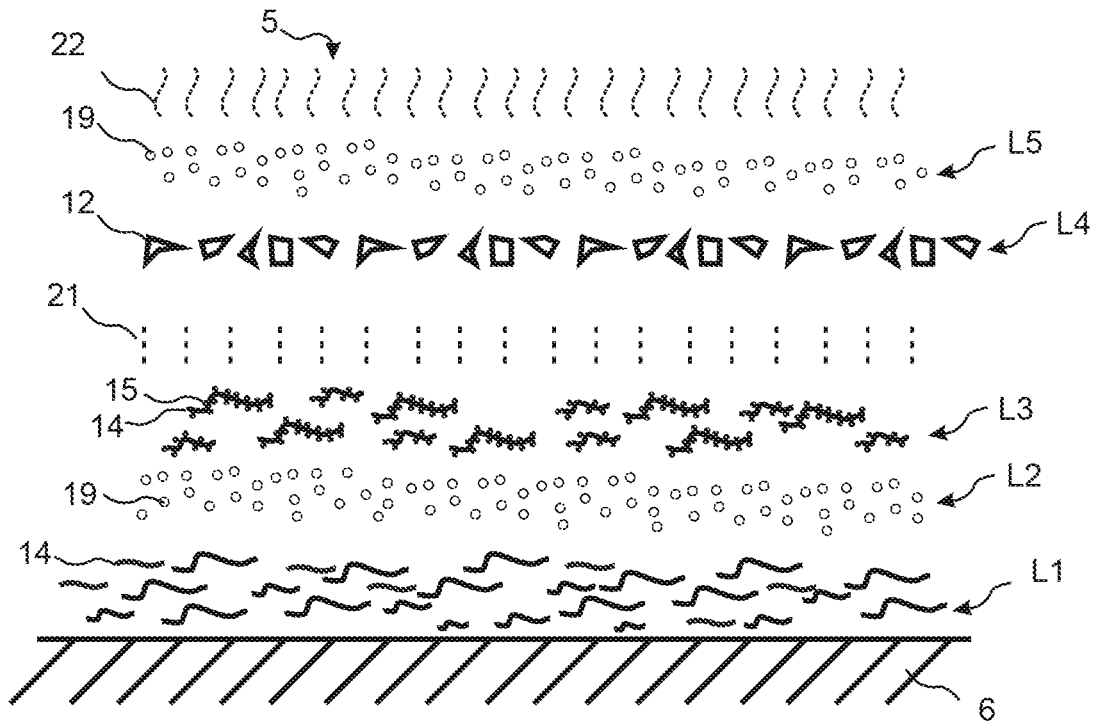
FIGS. 4a-b illustrate an embodiment of the invention.

FIG. 4a shows an embodiment of the invention where the surface layer 5 is formed by five separate layers L1-L5 of wood fibres 14, melamine formaldehyde particles 19, wood fibres mixed with pigments 14,15, aluminium oxide 12 and melamine formaldehyde particles as described in FIG. 3c. The first layer L1 comprises mainly wood fibres 14. The second layer L2 comprises mainly melamine formaldehyde particles 19. The third layer L3 comprises mainly wood fibres 14 mixed with pigments 15. Water 21 is applied on the fibres 14 mixed with pigments 15 of the third layer L3. A fourth layer L4 of mainly aluminium oxide 12 is applied. A fifth layer L5 of mainly melamine formaldehyde powder 19 is thereafter applied. All layers are heated by, for example, IR lamps 22 as a final step prior to pressing. The melamine formaldehyde particles 19 will melt during pressing and the liquid melamine formaldehyde binder will float upwards and downwards and the mix will be completely impregnated, cured and connected to the core 6. Aluminium particles 12 will be pressed into the powder by the melamine formaldehyde layer L5 during the initial stage of the pressing operation.

Figure 4B:
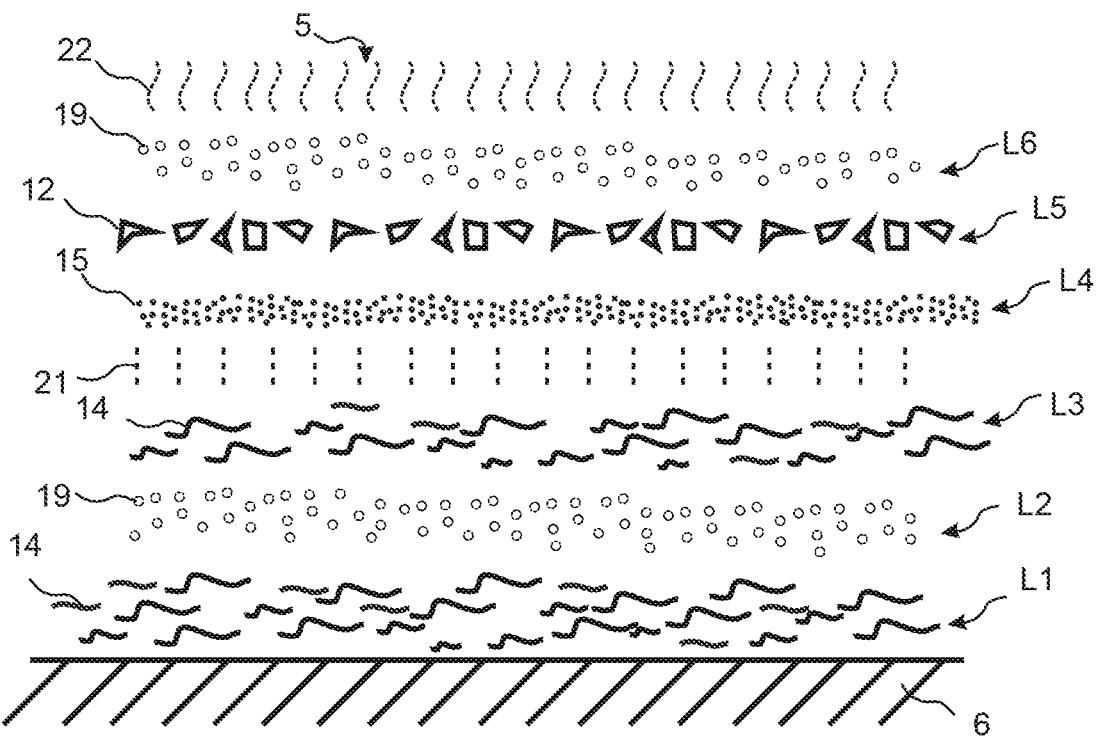

FIG. 4b shows an embodiment similar to the embodiment shown in FIG. 4a. The main difference is that wood fibres 14 and colour pigments 15 are applied as separate layers. This surface forming with six different layers L1-L6 applied on each other corresponds to the production method shown in FIG. 3d. The first layer L1 comprises mainly wood fibres 14. The second layer L2 comprises mainly melamine formaldehyde particles 19. The third layer L3 comprises mainly wood fibres 14. Water 21 is applied on the fibres 14 of the third layer L3. A fourth layer L4 of mainly pigments 15 is formed. A fifth layer L5 of mainly aluminium oxide 12 is formed. A sixth layer L6 of mainly melamine formaldehyde powder 19 is thereafter formed. All layers are heated by, for example, IR lamps 22 as a final step prior to pressing.

Wood fibres are generally the most difficult particles to scatter. The scattering properties may be improved considerably if fibres are impregnated with a thermosetting binder such as melamine formaldehyde or urea formaldehyde and dried prior to scattering. An increased density may be obtained and sticking between individual fibres may be reduced. A basic binder content of, for example, 10-20% or 10-40% may be applied by the impregnated fibres and a more specific and increased binder content adapted to the properties of various layers may be applied by a separate scattering of spray dried binder particles. The impregnated fibres may also comprise colour pigments and may be used as a basic layer that covers the board and provides a basic print layer for digital printing. Several different digitally printed decors may have the same print layer with the same basic colour.

Scattering of separate layer may be used to optimize the binder contents and the binder types. The lower layers may comprise a lower binder content than the upper layers. The lower layers may also comprise other types of binders, for example, urea or phenol formaldehyde binders and the upper layer may comprise melamine formaldehyde binders.

Figure 5A:
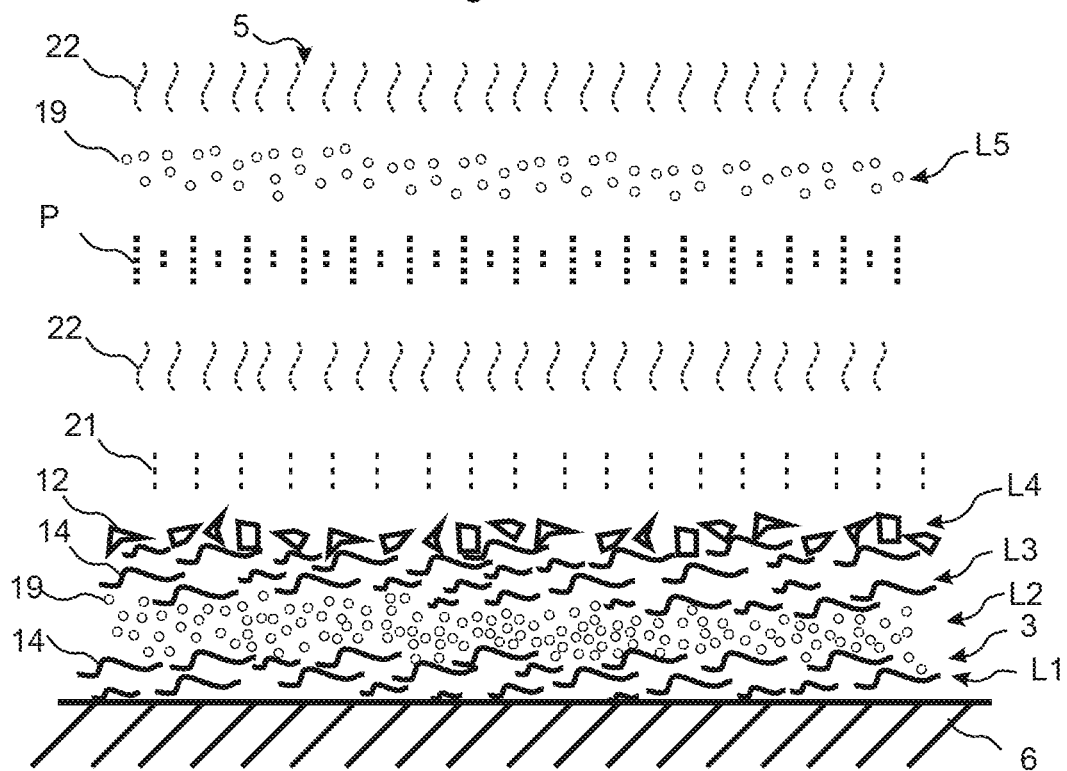
FIGS. 5a-b illustrate embodiments of the invention.
Figure 5B:
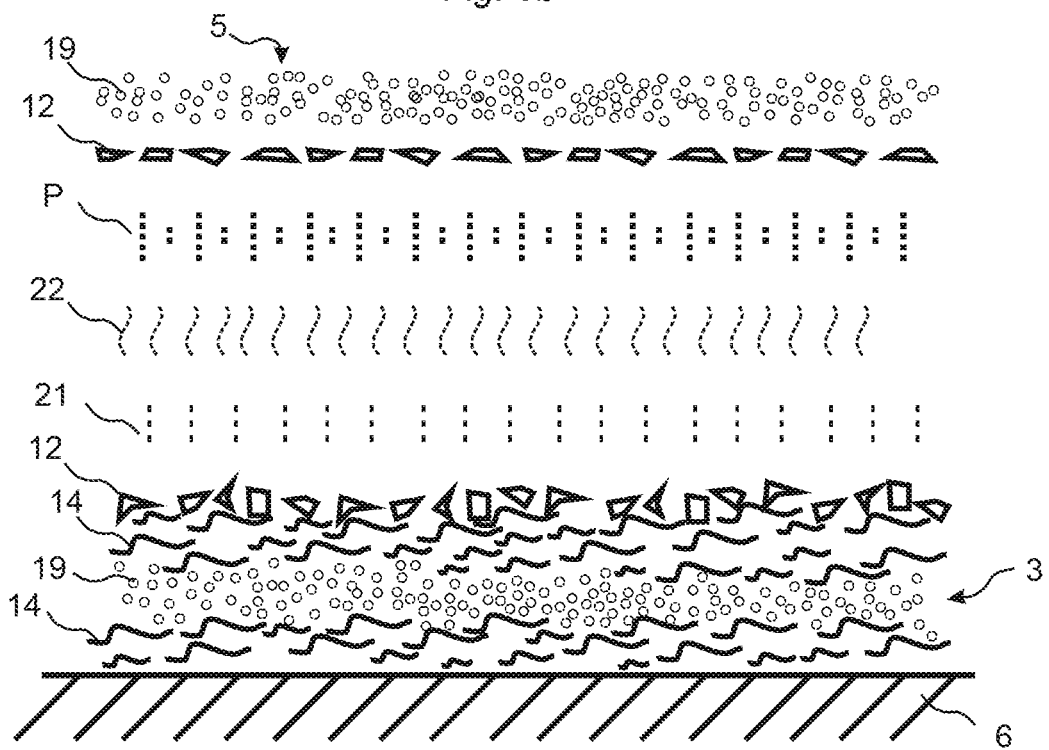

FIGS. 5a and 5b shows embodiments where five separate layers L1-L5 are combined with a digital print P where pigmented ink is injected into the powder. Cleaning of the dispensing devices may be avoided. FIG. 5a shows that a melamine formaldehyde layer L5 may cover the digital print P. FIG. 5b shows that the digital print P may be covered by a powder overlay comprising aluminium oxide 12 and melamine formaldehyde particles 19. Preferably bleached transparent wood fibres may also be applied over the print P. Both embodiments may have a sub layer 3 comprising a first layer L1 of mainly wood fibres 14, a second layer L2 of mainly melamine formaldehyde binder 19, a third layer L3 of mainly wood fibres 14, and preferably a fourth layer L4 of mainly aluminium oxide particles 12. Water 21 and IR lamps 22 may be applied.

Figure 6A:
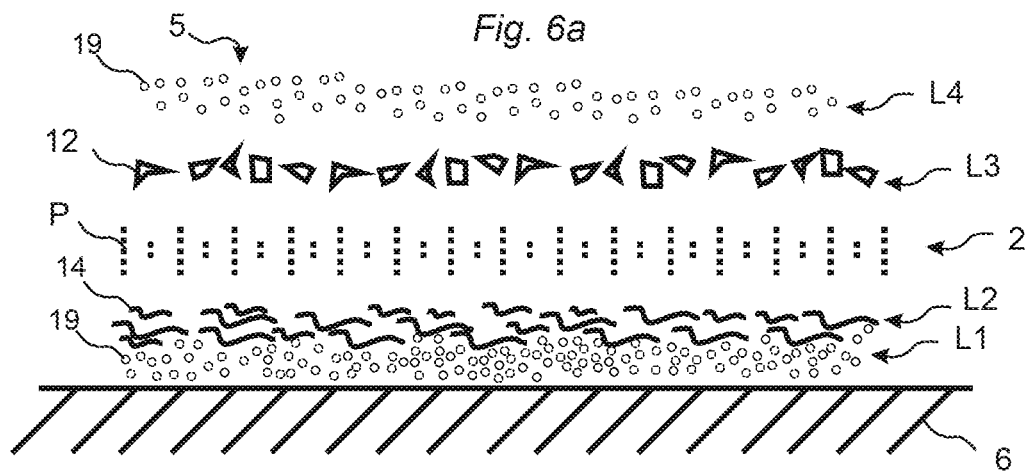
FIGS. 6a-c illustrate embodiments of the invention where the decorative surface is formed with digital ink printing.
Figure 6B:
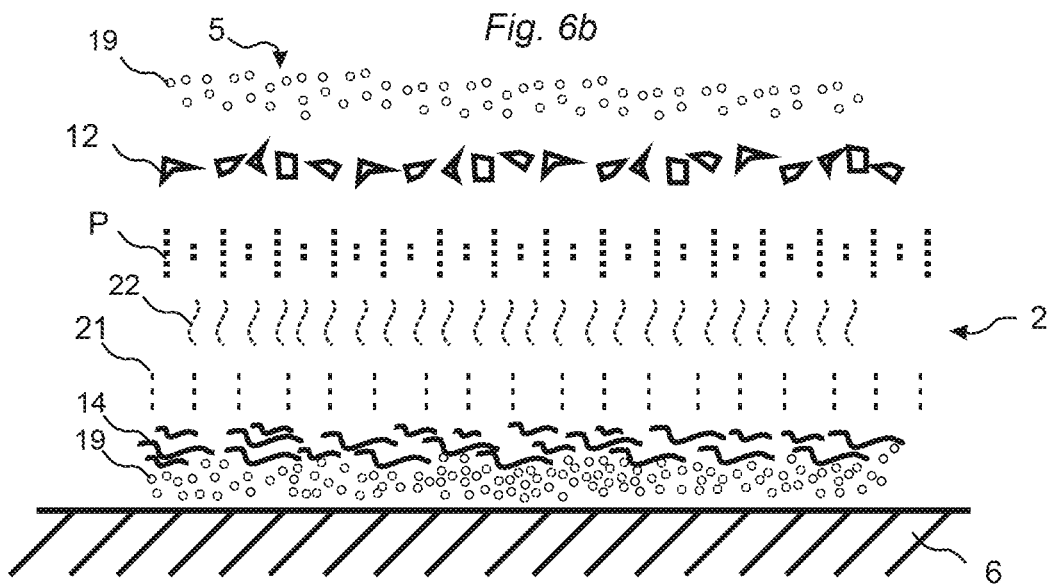
Figure 6C:
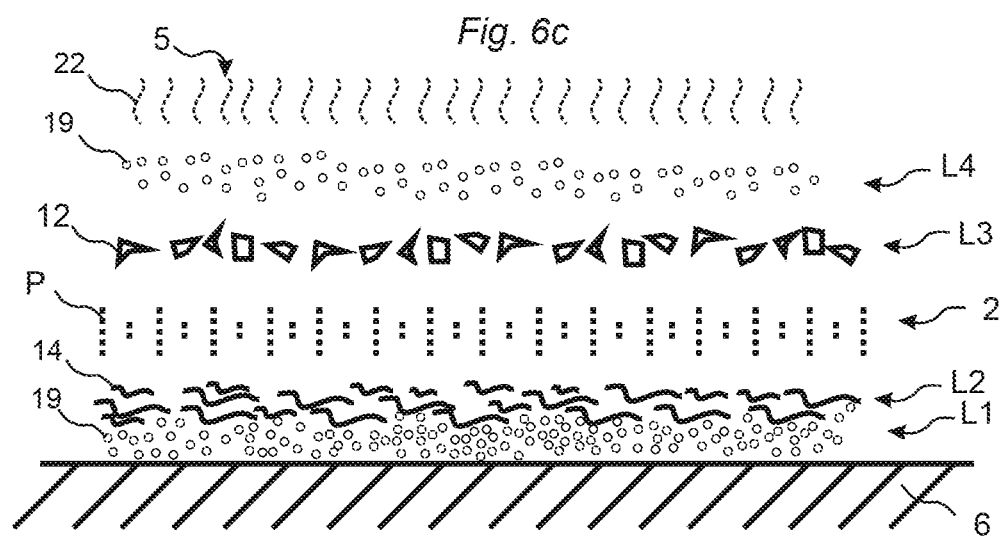

FIGS. 6a-6c show embodiments comprising a surface 5 with a digital print P and a WFF mix with only a top layer 2 comprising wood fibres 14, melamine formaldehyde powder 19 and aluminium oxide particles 12. The melamine formaldehyde powder 19 is in this embodiment applied between the core 6 and the wood fibres 14. FIG. 6a shows that no water may be needed since the ink that provides the digital print may be water based and may stabilize the powder without any additional heating prior to pressing. FIG. 6b shows a digital print P applied on a dried powder surface. FIG. 6c shows that the water from the digital print may be dried by IR and/or UV light 22 prior to pressing.

A two-step process may also be used to form a surface 5 with a digital print P. The pigments 15 and the liquid substance 21 of digital ink are applied separately. The advantage is that the digital print head only has to apply a liquid substance. Pigments or colorants are applied separately as dry powder. The main advantage is that larger pigments or colorants may be applied that do not have to be handled by a digital print head and such colorants are much easier to handle by a scattering device as described in FIG. 3b.

Figure 7A:
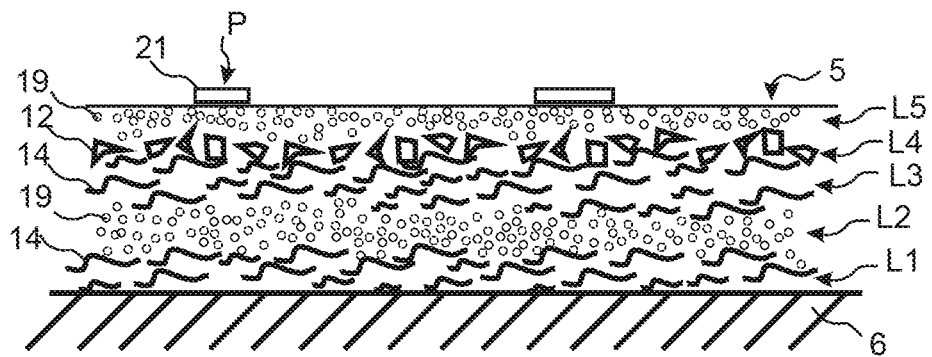
FIGS. 7a-d illustrate alternative embodiments of the invention where the decorative surface is formed with digital binder printing.
Figure 7B:
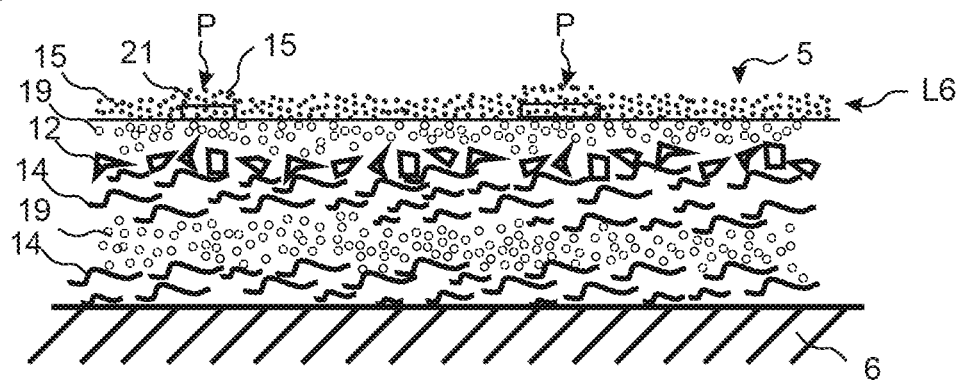
Figure 7C:
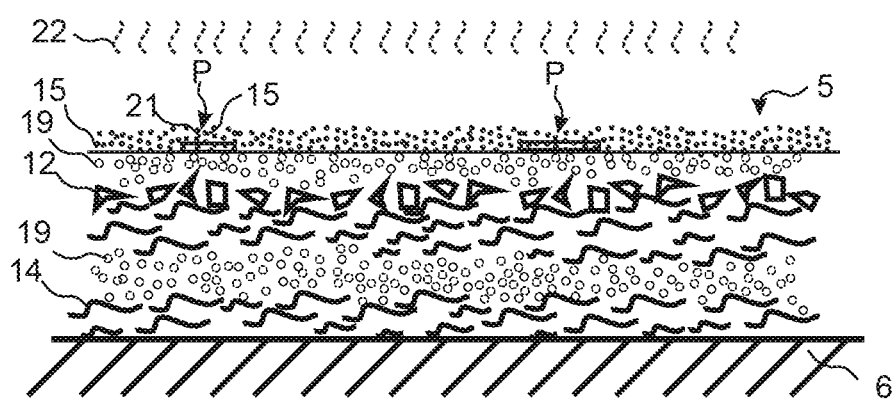
Figure 7D:
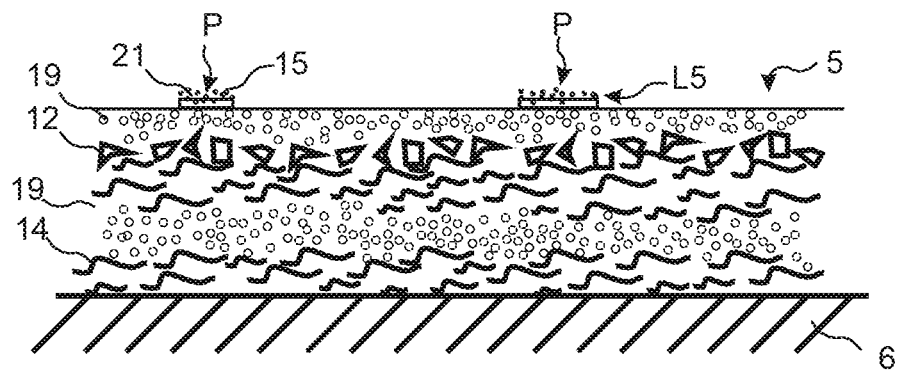

FIG. 7a shows that a pattern or image P may be formed digitally by an ink head that only applies a binder 21 on a surface. The binder may be water that is mixed by the dried melamine formaldehyde binder of the WFF mix when the water drops are applied on the powder mix. The pigments 15 are scattered randomly over the pattern as shown in FIG. 7b and the binder may be dried by, for example, an IR lamp as shown in FIG. 7c. The dried binder 21 connects some pigments that form the same pattern as the binder while other non-bonded pigments are removed by, for example, an air stream as shown in FIG. 7d. A second colour with a second binder pattern may be applied next to the first pattern or partly or completely over the first pattern. A protective layer of, for example, melamine formaldehyde particles and aluminium oxide as shown in the previous embodiments may cover the printed pattern. The core 6 with the printed image P is thereafter pressed in a press 25 that may be a continuous or discontinuous press.

This two-step process, where the pigments and a liquid binder are applied separately, may provide an image with the same quality as convectional digital printing technology. The cost for the binder and the colour pigments are however much lower than for traditional digital ink.

The binder 21 may be applied on the pigments 15 or the pigments 15 may be applied on the binder 21. The pigments may also be bonded digitally to a pattern by a laser beam that bonds some pigments to the surface by melting or curing a binder that may be mixed with the pigments or included in the surface under the pigments. A digitally created print is obtained when the non-bonded pigments are removed.

The binder 21 may comprise a thermosetting or a thermoplastic binder.

FIG. 8a shows a double scattering equipment 31 that may be used to mix and apply two different materials. The double scattering equipment comprises a first dispensing device 20a and a first moveable transportation device that may be a first roller 27a and a second dispensing device 20b and a second moveable transportation device that may be a second roller 27b. The first roller 27a may have a different surface structure and/or arrangement, e.g., different types of surface material, needles, etching, spacing, design, pattern, etc., than the second roller 27b. The transportation devices 27a, 27b are used to displace a first M1 and a second M2 material from the feeding hoppers 26a, 26b. The second roller 27b are adapted to displace the second material M2 on the first roller 27a. Thereby, the second material M2 is applied on the first material M1. The first and second material may be, for example, wood fibres 14 and colour pigments 15. Any other material combination may be used. The first roller 27a displaces a pre-determined amount of fibres 14, for example, an amount that corresponds to 100 g/m2. The second roller 27b applies a second material on the first roller 27a that, for example, corresponds to an amount of pigments 15 of 10 g/m2. These two materials M1, M2 are in a first step applied as essentially separate layers and are thereafter mixed when they pass oscillating and/or rotating brush 29a and preferably one or several oscillating and/or rotating meshes 30. The double scattering equipment 31 may be used to mix and apply all combinations of different materials. Fibres 14 and melamine formaldehyde particles 19 may, for example, be mixed and applied as backing layer or sub layer. Melamine formaldehyde 19 and aluminium oxide 12 may be mixed and applied as, for example, a powder overlay. A high precision mixing and application may be obtained in a flexible way since increasing or decreasing the speed of the first and second roller may adjust the relative amounts of materials in the final mix.

FIG. 8b shows a triple scattering equipment 32 that comprises three cooperating dispensing devices 20a, 20b, 20c with three material feeding hoppers 26a, 26b, 26c and three material transportation devices 27a, 27b, 27c that in the shown embodiment are rollers. A first roller 27a may apply a first material M1, for example, melamine formaldehyde particles 19, on a second roller 27b. This second roller may comprise a structured surface 13 with protrusions 17 and grooves or cavities 16 as shown in FIG. 8c. The melamine formaldehyde particles may be applied in the cavities 16 and they are thereafter moved into the second hopper 26b where a second material M2, which may be wood fibres 14, is applied as a layer on the melamine formaldehyde particles 19. The second hopper 26*b* comprises mainly fibres and only a small amount of melamine formaldehyde particles are moved through the second hopper 26*b*. The amount of fibres that are applied on the first material layer may be adjusted with the doctor blade 28*b*, and the structure of the roller surface may be adapted to the type of materials that the roller should handle. The second roller displaces the two materials under the third dispensing device 20*c* where a third material layer M3 may be applied, such as, for example, aluminium particles. All these three materials 19,14,12 are essentially applied as three separate layers when they reach a brush, preferably an oscillating brush 29*b* that mixes the materials when it moves back and forth sideways across the scattering roller 27*b*. One or several oscillating meshes 30 may be used to increase the mixing of the three materials and a high precession mix may be obtained.

Figure 9A:
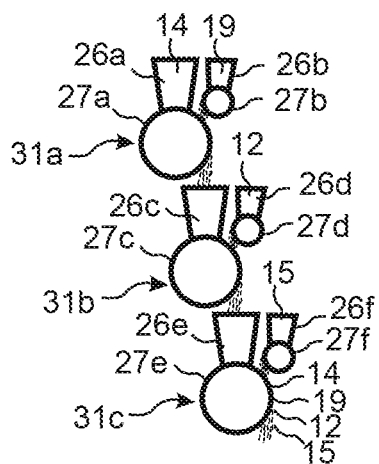
FIGS. 9a-d illustrate embodiments of scattering methods and equipment.
Figure 9B:
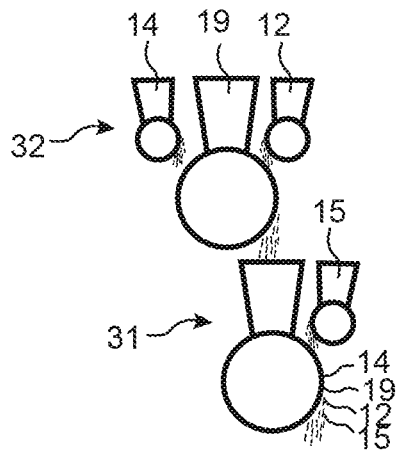

One or several double 31*a*, 31*b*, 31*c* and/or triple 32*a*, 32*b* scattering equipment may be combined such that one of the equipment scatter a mixed material into another unit where additional materials may be added and a new mix may be produced. This is shown in FIGS. 9*a* and 9*b*. A complete WFF mix comprising fibres 14, binders 19, pigments 15 and wear resistant particles 12 may be obtained with three double scattering equipment 31*a*, 31*b*, 31*c* or with one triple scattering equipment 32 and one double scattering equipment 31 as shown in FIG. 9*b*. Only one of the dispensing devices is used to apply pigments 15 and this will reduce the cleaning time considerably when a colour change is made.

Figure 9C:
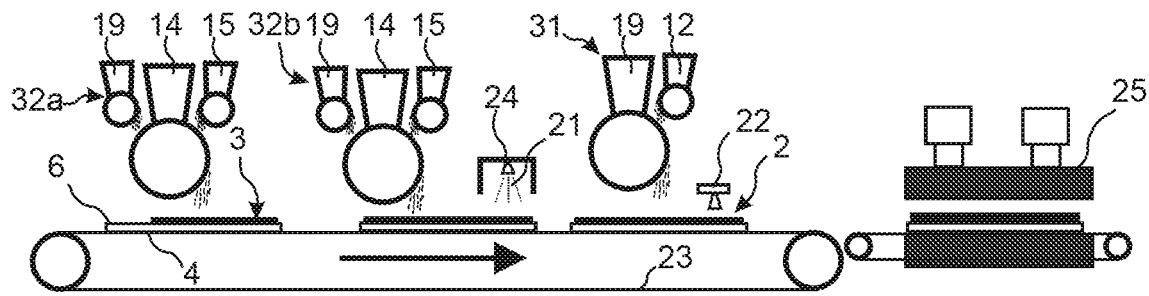

FIG. 9*c* shows a production line where a sub layer 3 comprising binders 19, fibres 14 and pigments 15 is applied by a first triple scattering equipment 32*a*. A second triple scattering equipment 32*b* applies the same type of materials on the sub layer. The mix is thereafter sprayed with water 21 and a powder overlay comprising melamine formaldehyde 19 and aluminium oxide 12 is applied by a double scattering equipment 31 as protective layer such that a top layer 2 is obtained. The mix is dried with, for example, IR lamps 22 and cured under heat and pressure in a press 25.

Figure 9D:
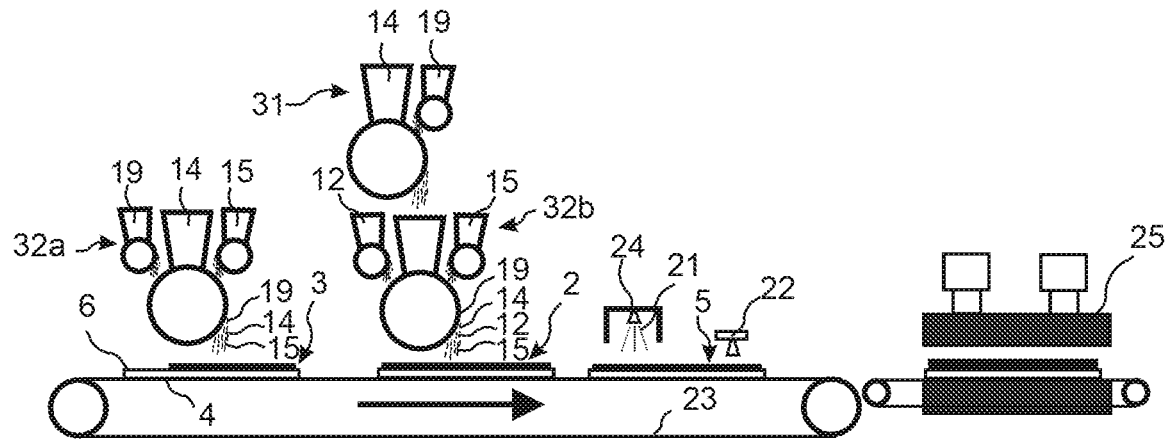

FIG. 9*d* shows that a similar mix may be applied by using one triple scattering equipment 32*a* in combination with one multi scattering equipment that in this embodiment comprises a double scattering equipment 31 that scatters a portion of the mix into a triple scattering equipment 32*b*.

Figure 10A:
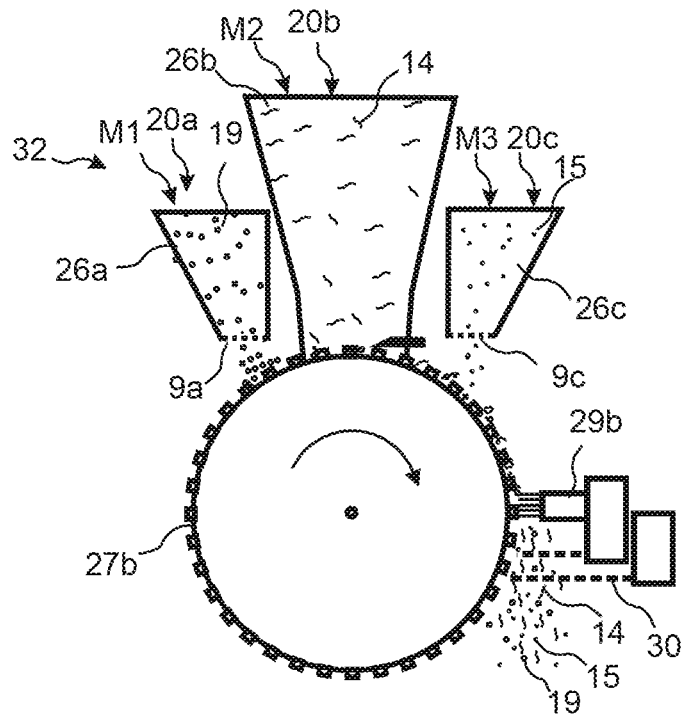
FIGS. 10a-b illustrate embodiments of scattering methods and equipment.

FIG. 10*a* shows a triple scattering equipment 32 that, for example, may be used to apply a mix where high precision scattering is not required, for example, a mix that may be used to form the backing layer 4 or the sub layer 3. The moving part or the rollers of the first 20*a* and third 20*c* dispensing devices have been replaced with nets 9*a*, 9*c* and oscillation hoppers 26*a*, 26*c* that move back and forth and spread the material on a moveable transportation device 27*b* that may be a roller.

Figure 10B:
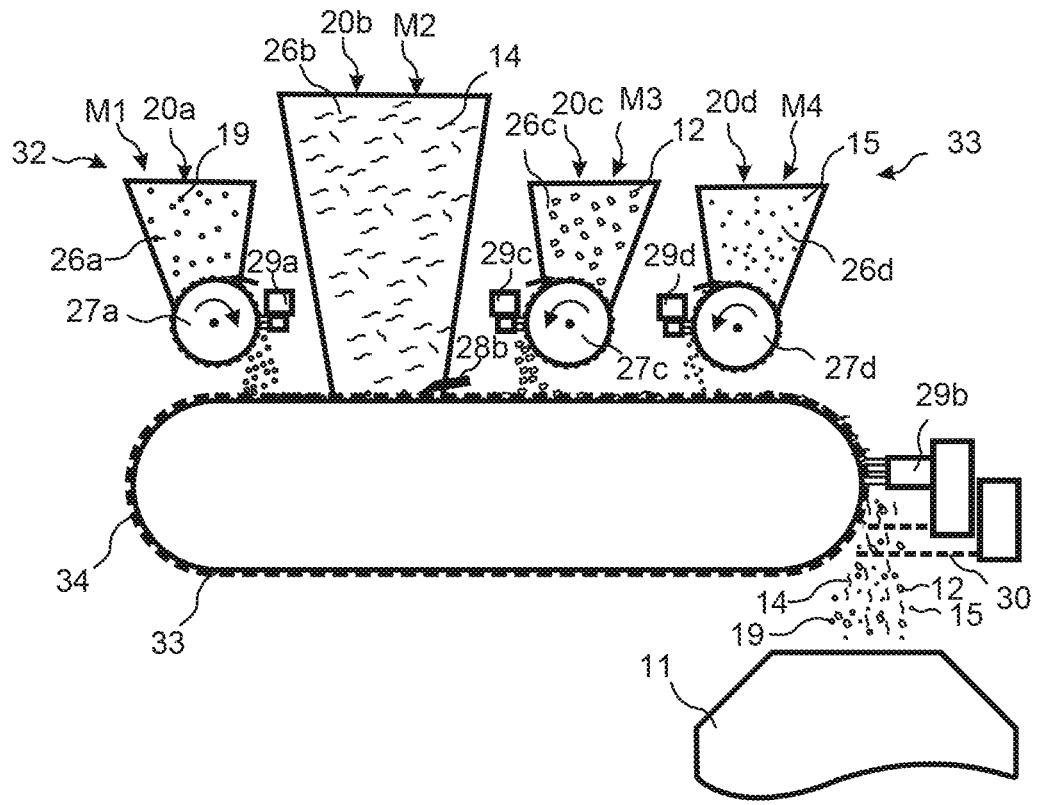

FIG. 10*b* shows that the roller 27 may be replaced with a scattering belt 33 as a moveable transportation device. This allows that several separate dispensing devices 20*a*, 20*b*, 20*c*, 20*d* may be used to apply different materials M1, M2, M3, M4 as layers on the scattering belt 33 that may serve as a movable transportation device and a dispensing device. One or several layers may be displaced into a main material-feeding hopper 26*b* and several layers may be applied on the material that is displaced and moved out from the main hopper 26*b*. One or several brushes 29*b* and meshes 30 may be used to make the final mixing of the materials 19, 14, 12, 15 that are applied as individual layers. The scattering belt 33 allows that many separate scattering stations may be combined and a high mixing capacity may be reached. The scattering belt may be used to apply materials on a core or as a mixing station that applies a mix into, for example, a mixing container 11 or a transportation bag.

Several dispensing devices comprising different colour pigment may be used to apply different pigments locally on the scattering belt 33. When the brush 29 mixes such pigments various designs similar to stone or tiles may be obtained.

Figure 11A:
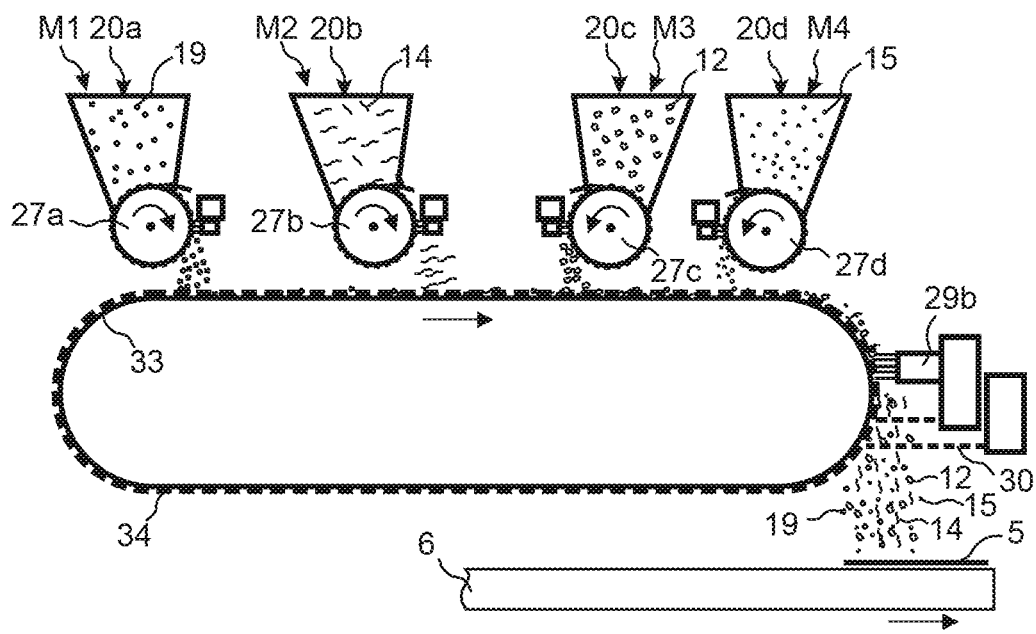
FIGS. 11a-d illustrate embodiments of scattering methods and equipment.

FIG. 11*a* shows that the main material feeding hopper 26*b* may be replaced by a separate dispensing device with a roller 27*b* similar to the other units and all layers may be scattered on a scattering belt 33 with a non-contact process where only particles are applied on the scattering belt 33. The scattering belt 33 is in this embodiment only used as a movable transportation device and is not used as a dispensing device. The scattering equipment may, for example, comprise four dispensing devices and a complete WFF mix with fibres 14, binders 19, pigments 15 and wear resistant particles 12 may be produced with a non-contact scattering on a scattering belt 33.

The non-contact process allows that very simple scattering belts may be used and no needles or specific surface structures are needed in some applications. The scattering belt may be made of metal or plastic or combinations of such materials and may have a surface structure similar to the surface structures that are described for the rollers. The belt surface 34 may be formed by etching and may comprise needles and grooves. Meshes and nets may also be used. All such structured belt surfaces 34 will generally improve the mixing quality when brushes or other similar mechanical devices mix and remove the layers.

Scattering with a scattering belt makes it possible to use in line measuring of the weight of particles that are applied, by a measurement of the variations of the weight of the scattering belt.

Figure 11B:
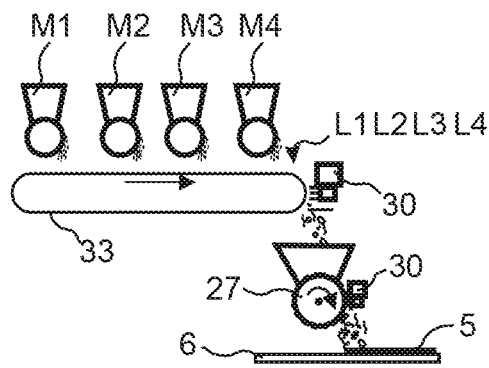
Figure 11C:
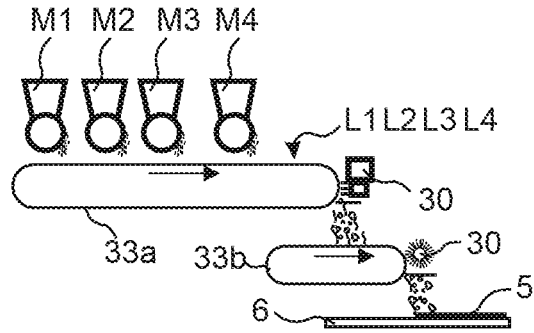

FIGS. 11*b* and 11*c* shows that a scattering belt 33, 33*a* may be used to apply particles on a roller 27 or on a second scattering belt 33*b*. Such a production equipment and method may be used to improve the mixing of the particles that will be mixed twice when they pass rotating or oscillating brushes 30.

Figure 11D:
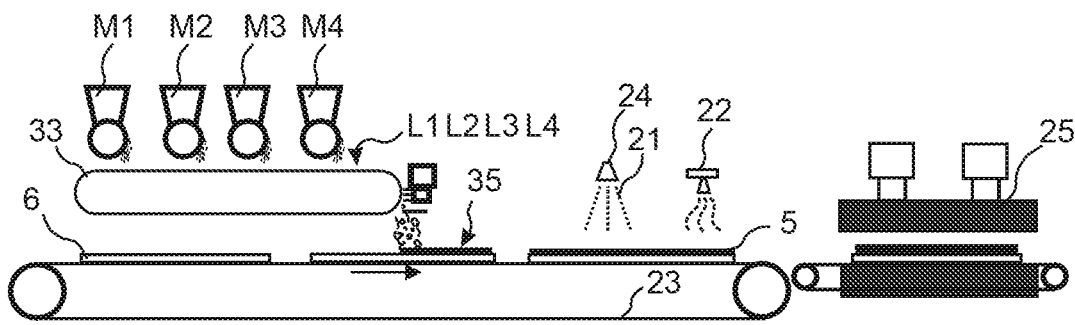

FIG. 11*d* shows a production line with a belt scattering unit 33 which may be used to apply a complete WFF mix on a core 6. The mix is sprayed with water 21 and dried by IR lamps 22, hot air or similar prior to pressing.

All described embodiments may be combined and single, double or triple scattering equipment may, for example, be used to apply a mix on a scattering belt 33 and the belt may be used to improve the mixing, increase the capacity or just as a measuring device to measure the weight of particles that are applied.

Materials savings may be reached with a scattering belt. A separate mix with colour pigments may be applied partially on a scattering belt where edge portions of the panel will be formed and a sub layer may only have colour pigments at the edges, which are visible when, for example, bevels are formed.

All references to layers means material portions with a thickness or vertical extension, which is much smaller than the horizontal extension and where the average thickness generally is similar between different portions. Preferred average thickness of the applied layers may be less than 3 mm. Some layers may have an average vertical extension below 1.0 mm. A layer may comprise parts, which are not connected, for example, when particles are applied between needles or protrusions, which comprises surface portions of dispensing devices or transportation devices.

EMBODIMENTS

1. A method of forming a surface layer (5) comprising a first, second and third layer (L1, L2, L3), the method comprising:
   forming a first layer (L1) comprising mainly fibres (14),
   forming a second layer (L2) comprising mainly wear resistant particles (12), and
   forming a third layer (L3) comprising mainly particles of a thermosetting binder (19).

2. The method as in embodiment 1, wherein the first layer (L1) is applied on a substrate, preferably a core (6).

3. The method as in embodiment 2, wherein the core (6) is a wood fibre based board, preferably a HDF board.

4. The method as in embodiment 2 or 3, wherein the surface layer and the core form a panel (1), preferably a floor panel.

5. The method as in any one of the preceding embodiments, wherein the fibres (14) are wood fibres.

6. The method as in any one of the preceding embodiments, wherein the thermosetting binder (19) is a melamine formaldehyde binder, preferably in powder form.

7. The method as in any one of the preceding embodiments, wherein the wear resistant particles (12) are aluminium oxide particles.

8. The method as in any one of the preceding embodiments, wherein the second layer (L2) is applied on the first layer (L1) and the third layer (L3) is applied on the second layer (L2).

9. The method as in any one of the preceding embodiments, wherein the first, second and third layers (L1, L2, L3) each comprises essentially one material with a material content of at least about 80% of the total weight of the layer.

10. The method as in any one of the preceding embodiments, wherein the first layer (L1) comprises colour pigments (15) and at least about 80% by weight wood fibres (14).

11. A method of forming a surface layer (5) on a substrate (6), the method comprising:
    forming a first layer (L1) of a first material (M1),
    applying a second layer (L2) of a second material (M2) on the first layer (L1),
    mixing the first and second layers (L1, L2) into a mix comprising the first (M1) and the second (M2) material, and
    applying the mix on a substrate (6) for forming a surface layer (5).

12. The method as in embodiment 11, wherein the first and second layers (L1, L2) are applied on a moveable transportation device (27a-d; 33).

13. The method as in embodiment 11 or 12, wherein the substrate is a core (6), preferably a wood fibre based core such as a HDF board.

14. The method as in embodiment 13, wherein the core (6) and the surface layer (5) form a panel (1), preferably a floor panel.

15. The method as in any one of embodiments 11-14, wherein the first material (M1) comprises fibres (14), preferably wood fibres, and the second material (M2) comprises a thermosetting binder (19), preferably melamine formaldehyde particles.

16. The method as in any one of embodiments 11-14, wherein the first material (M1) comprises thermosetting binder (19), preferably melamine formaldehyde particles, and the second material (M2) comprises fibres (14), preferably wood fibres.

17. The method as in any one of embodiments 11-16, further comprising forming a third layer (L3) of a third material (M3).

18. The method as in embodiment 17, wherein the third material (M3) comprises wear resistant particles (12) or colour pigments (15).

19. The method as in any one of embodiments 11-18, further comprising forming a fourth layer (L4) of a fourth material (M4).

20. The method as in embodiment 19, wherein the fourth material (M4) comprises wear resistant particles (12) or colour pigments (15).

21. A scattering equipment for mixing a first (M1) and second (M2) material, wherein the equipment comprises:
    a first dispensing device (20a),
    a second dispensing device (20b),
    at least one moveable transportation device (27a; 27b; 33), and
    a mixing device (29a; 29b),
    wherein the first dispensing device (20a) is adapted to apply a first material (M1) on said transportation device (27a; 27b; 33), the second dispensing device (20b) is adapted to apply a second material (M2) on the first material (M1), said transportation device (27a; 27b; 33) is moveable between the first and the second dispensing devices (20a, 20b), and the mixing device (29a, 29b) is adapted to mix the first and second material (M1, M2) and to remove the first and second material (M1, M2) from said transportation device (29a; 29b).

22. A scattering equipment as in embodiment 21, wherein the first dispensing device (20a) comprises a hopper (26a) and a roller (27a), wherein the hopper (26a) is adapted to dispense the first material (M1) to the roller (27a), and the roller (27a) is adapted to dispense the first material (M1) to said transportation device (27b; 33), and the second dispensing device (20b) comprises a hopper (26b) adapted to dispense the second material (M2) to said transportation device (27b; 33).

23. A scattering equipment as in embodiment 21, wherein the first dispensing device (20a) comprises a hopper (26a) adapted to dispense the first material (M1) to said transportation device (27a; 33), and the second dispensing device (20b) comprises a hopper (26b) and a roller (27b), wherein the hopper (26b) is adapted to dispense the second material (M2) to the roller (27b), and the roller (27b) is adapted to dispense the second material (M2) to said transportation device (27a; 33).

24. A scattering equipment as in embodiment 21, wherein both the first and the second dispensing devices (20a, 20b) comprise a hopper (26a, 26b) and a roller (27a, 27b), respectively, wherein the hoppers (26a, 26b) are adapted to dispense the first and the second material (M1, M2), respectively, to the rollers (27a, 27b), and the rollers (27a, 27b) are adapted to dispense the first and second material (M1, M2) to said transportation device (33).

25. A scattering equipment as in embodiment 21, wherein both the first and the second dispensing devices (20a, 20b) comprise a hopper (26a, 26b) adapted to dispense the first and second material (M1, M2) to said transportation device (27b; 33).

26. A scattering equipment as in any one of embodiments 21-25, wherein the first material (M1) comprises fibres (14), preferably wood fibres, and the second material (M2) comprises a thermosetting binder (19), preferably melamine formaldehyde particles.

27. A scattering equipment as in any one of embodiments 21-25, wherein the first material (M1) comprises a thermosetting binder (19), preferably melamine formaldehyde particles, and the second material (M2) comprises fibres (14), preferably wood fibres.

28. A scattering equipment as in any one of embodiments 21-27, further comprising a third dispensing device (20c) being adapted to dispense a third material (M3).

29. A scattering equipment as in embodiment 28, wherein the third material (M3) comprises wear resistant particles (12) or colour pigments (15).

30. A scattering equipment as in any one of embodiments 21-29, further comprising a fourth dispensing device (20d) being adapted to dispense a fourth material (M4).

31. A scattering equipment as in embodiment 30, wherein the fourth material (M4) comprises wear resistant particles (12) or colour pigments (15).

32. A scattering equipment as in any one of embodiments 21-31, wherein said transportation device comprises a scattering belt (33).

33. A scattering equipment as in any one of embodiments 21-31, wherein said transportation device comprises a roller (27a; 27b).

34. A scattering equipment as in any one of embodiments 21-33, wherein the mixing device comprises a moving brush (29a, 29b).

The invention claimed is:

1. A method of forming a paper-free surface layer of a building panel, the method comprising:
   separately forming the following layers:
      a binder layer comprising at least 50% by weight of particles of a thermosetting binder powder, and
      a wear resistant layer comprising at least 50% by weight of wear resistant particles; and
   pressing, under heat and pressure, the binder layer and the wear resistant layer to combine and mix the wear resistant particles of the wear resistant layer and the thermosetting binder of the binder layer to form the paper-free surface layer.

2. The method as claimed in claim 1, wherein the the wear resistant layer and the binder layer are applied on a substrate prior to pressing.

3. The method as claimed in claim 1, wherein the the wear resistant layer and the binder layer are applied on a core prior to pressing.

4. The method as claimed in claim 3, wherein the core is a wood fibre based board.

5. The method as claimed in claim 3, wherein the core is an HDF board.

6. The method as claimed in claim 3, wherein the paper-free surface layer and the core form the building panel.

7. The method as claimed in claim 3, wherein the paper-free surface layer and the core form a floor panel.

8. The method as claimed in claim 1, wherein the thermosetting binder is a melamine formaldehyde binder.

9. The method as claimed in claim 1, wherein the thermosetting binder is provided in powder form.

10. The method as claimed in claim 1, wherein the wear resistant particles are aluminium oxide particles.

11. The method as claimed in claim 1, wherein the binder layer is applied on the wear resistant layer.

12. The method as claimed in claim 1, wherein at least one of the wear resistant layer and the binder layer further comprises colour pigments.

13. The method as claimed in claim 1, wherein the wear resistant layer and the binder layer each comprise one material with a material content of at least about 80% of the total weight of the layer.

14. The method as claimed in claim 1, further comprising forming a fibre layer.

15. The method as claimed in claim 14, the method comprising forming the fibre layer, wherein the fibre layer comprises at least 50% by weight of fibres.

16. The method as claimed in claim 15, wherein the fibres are wood fibres.

17. The method as claimed in claim 15, wherein the fibre layer comprises one material with a material content of at least about 80% of the total weight of the layer.

18. The method as claimed in claim 15, wherein the fibre layer comprises colour pigments and at least about 80% by weight wood fibres.

19. The method as claimed in claim 14, wherein the wear resistant layer is applied on the fibre layer.

20. The method as claimed in claim 14, wherein the pressing includes pressing the fibre layer, the binder layer and the wear resistant layer together.

21. The method as claimed in claim 14, wherein the fibre layer, the wear resistant layer and the binder layer are applied on a substrate prior to pressing.

22. The method as claimed in claim 14, wherein the fibre layer, the wear resistant layer and the binder layer are applied on a core prior to pressing.

* * * * *

UNITED STATES PATENT AND TRADEMARK OFFICE
CERTIFICATE OF CORRECTION

PATENT NO. : 11,905,717 B2  
APPLICATION NO. : 16/516859  
DATED : February 20, 2024  
INVENTOR(S) : Darko Pervan Page 1 of 1

It is certified that error appears in the above-identified patent and that said Letters Patent is hereby corrected as shown below:

In the Claims

Column 17, Lines 43-44, Claim 2:
"wherein the the wear resistant layer"
Should read:
-- wherein the wear resistant layer --

Column 17, Lines 46-47, Claim 3:
"wherein the the wear resistant layer"
Should read:
-- wherein the wear resistant layer --

Signed and Sealed this  
Twenty-fourth Day of September, 2024

Katherine Kelly Vidal  
*Director of the United States Patent and Trademark Office*